(12) United States Patent
Roman et al.

(10) Patent No.: US 10,166,465 B2
(45) Date of Patent: Jan. 1, 2019

(54) CONTEXTUAL USER INTERFACE BASED ON VIDEO GAME PLAYBACK

(71) Applicant: Essential Products, Inc., Palo Alto, CA (US)

(72) Inventors: Manuel Roman, Sunnyvale, CA (US); Mara Clair Segal, San Francisco, CA (US); Dwipal Desai, Palo Alto, CA (US); Andrew E. Rubin, Los Altos, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

(21) Appl. No.: 15/629,459

(22) Filed: Jun. 21, 2017

(65) Prior Publication Data
US 2018/0207522 A1    Jul. 26, 2018

Related U.S. Application Data

(63) Continuation-in-part of application No. 15/604,402, filed on May 24, 2017, which is a continuation-in-part of application No. 15/600,563, filed on May 19, 2017, which is a continuation-in-part of application No. 15/587,201, filed on May 4, 2017.

(60) Provisional application No. 62/506,168, filed on May 15, 2017, provisional application No. 62/486,359, filed on Apr. 17, 2017, provisional application No. 62/486,365, filed on Apr. 17, 2017, provisional application No. 62/448,912, filed on Jan. 20, 2017.

(51) Int. Cl.
*G06F 3/048* (2013.01)
*A63F 13/23* (2014.01)
*G06F 3/0484* (2013.01)

(52) U.S. Cl.
CPC .......... *A63F 13/23* (2014.09); *G06F 3/04842* (2013.01); *A63F 2300/308* (2013.01)

(58) Field of Classification Search
CPC .. A63F 13/58; A63F 13/537; A63F 2300/301; A63F 2300/303
See application file for complete search history.

(56) References Cited

U.S. PATENT DOCUMENTS 6,052,556 A    4/2000   Sampsell et al.
6,141,003 A    10/2000  Chai et al.
(Continued)

FOREIGN PATENT DOCUMENTS

WO    2004034210 A2    4/2004
WO    2017053437 A1    3/2017

OTHER PUBLICATIONS

Vlasic, Dan, Review Unkilled—Zombies in New York and North Korean Invasion, Sep. 26, 2015, www.pocketmeta.com, pp. 1-14.*

(Continued)

*Primary Examiner* — Ryan F Pitaro
(74) *Attorney, Agent, or Firm* — Perkins Coie LLP

(57) ABSTRACT

A contextual user interface based on video game playback is described. An assistant device can receive video game state information indicating a state of a playback of a video game on a video game console. Using that information, the assistant device can determine characteristics of the playback and generate a button on a graphical user interface (GUI) based on the characteristics. A user can then select the button and cause the assistant device to instruct the video game console to perform a corresponding action.

24 Claims, 13 Drawing Sheets

(56) References Cited

U.S. PATENT DOCUMENTS

| | | |
|---|---|---|
| 6,332,163 B1 | 12/2001 | Bowman-Amuah |
| 6,754,904 B1 | 6/2004 | Kirsh et al. |
| 7,340,438 B2 | 3/2008 | Nordman et al. |
| 7,458,093 B2 | 11/2008 | Dukes et al. |
| 7,461,343 B2 | 12/2008 | Kates |
| 7,620,703 B1 | 11/2009 | Shteyn et al. |
| 8,549,578 B2 | 10/2013 | Herigstad et al. |
| 8,745,661 B2 | 6/2014 | Ellis et al. |
| 8,826,322 B2 | 9/2014 | Bliss et al. |
| 8,863,008 B2 | 10/2014 | Chan et al. |
| 9,032,296 B1 | 5/2015 | Lin et al. |
| 9,104,886 B1 | 8/2015 | Dolbakian et al. |
| 9,259,651 B1* | 2/2016 | Yano ............... A63F 13/40 |
| 9,386,354 B2 | 7/2016 | Archibong et al. |
| 9,424,840 B1 | 8/2016 | Hart et al. |
| 9,460,715 B2 | 10/2016 | Hart et al. |
| 9,480,920 B2* | 11/2016 | Ooya ............... A63F 13/31 |
| 9,536,106 B2 | 1/2017 | Fram et al. |
| 9,542,060 B1 | 1/2017 | Brenner et al. |
| 9,548,066 B2 | 1/2017 | Jain et al. |
| 9,614,964 B2 | 4/2017 | Stepanian et al. |
| 9,635,410 B2 | 4/2017 | Slothouber et al. |
| 9,646,145 B2 | 5/2017 | Vida et al. |
| 2001/0043232 A1 | 11/2001 | Abbott et al. |
| 2002/0078453 A1 | 6/2002 | Kuo et al. |
| 2002/0089606 A1 | 7/2002 | Forler et al. |
| 2002/0162120 A1* | 10/2002 | Mitchell ............ H04N 7/165 725/135 |
| 2002/0162121 A1 | 10/2002 | Mitchell |
| 2002/0173295 A1 | 11/2002 | Nykanen et al. |
| 2002/0174073 A1 | 11/2002 | Nordman et al. |
| 2002/0184098 A1 | 12/2002 | Giraud et al. |
| 2002/0188589 A1 | 12/2002 | Salmenkaita et al. |
| 2003/0004937 A1 | 1/2003 | Salmenkaita et al. |
| 2003/0229900 A1 | 12/2003 | Reisman |
| 2004/0002932 A1 | 1/2004 | Horvitz et al. |
| 2004/0176958 A1 | 9/2004 | Salmenkaita et al. |
| 2005/0043095 A1* | 2/2005 | Larson ............... A63F 13/02 463/42 |
| 2005/0136988 A1* | 6/2005 | Villamil ............. H04W 8/22 455/567 |
| 2005/0137747 A1 | 6/2005 | Miro et al. |
| 2005/0227762 A1* | 10/2005 | Tahara ............... A63F 13/10 463/30 |
| 2005/0283532 A1 | 12/2005 | Kim et al. |
| 2006/0048189 A1 | 3/2006 | Park et al. |
| 2006/0123053 A1 | 6/2006 | Scannell |
| 2006/0184800 A1 | 8/2006 | Rosenberg |
| 2006/0223637 A1* | 10/2006 | Rosenberg .......... A63F 13/10 463/47 |
| 2007/0015580 A1* | 1/2007 | Hunter ............... A63F 13/12 463/39 |
| 2007/0157320 A1 | 7/2007 | Collins et al. |
| 2008/0062318 A1 | 3/2008 | Ellis et al. |
| 2008/0088421 A1 | 4/2008 | McMillan et al. |
| 2008/0214210 A1 | 9/2008 | Rasanen et al. |
| 2008/0297589 A1 | 12/2008 | Kurtz et al. |
| 2008/0298571 A1 | 12/2008 | Kurtz et al. |
| 2009/0064221 A1 | 3/2009 | Stevens et al. |
| 2009/0138903 A1 | 5/2009 | Blanchard et al. |
| 2009/0150340 A1 | 6/2009 | Lhuillier et al. |
| 2009/0288013 A1 | 11/2009 | Zhang et al. |
| 2009/0327894 A1 | 12/2009 | Rakib et al. |
| 2010/0066804 A1 | 3/2010 | Shoemake et al. |
| 2010/0106782 A1* | 4/2010 | Huang ............... G06Q 10/107 709/206 |
| 2010/0257565 A1 | 10/2010 | Lucas et al. |
| 2010/0311503 A1* | 12/2010 | McMain ............ A63F 13/537 463/36 |
| 2010/0313239 A1 | 12/2010 | Chakra et al. |
| 2011/0077078 A1* | 3/2011 | Taoka ............... A63F 13/10 463/31 |
| 2011/0134322 A1 | 6/2011 | Wills et al. |
| 2011/0137727 A1* | 6/2011 | Chung ............... G06F 3/0346 705/14.55 |
| 2011/0169928 A1* | 7/2011 | Gassel ............... H04N 13/044 348/53 |
| 2011/0211584 A1 | 9/2011 | Mahmoud et al. |
| 2011/0285704 A1* | 11/2011 | Takeda ............... A63F 13/54 345/419 |
| 2012/0034904 A1 | 2/2012 | LeBeau et al. |
| 2012/0086630 A1* | 4/2012 | Zhu ............... A63F 13/355 345/156 |
| 2012/0110621 A1 | 5/2012 | Gossweiler et al. |
| 2012/0117593 A1 | 5/2012 | Pan et al. |
| 2012/0142414 A1* | 6/2012 | Murakami .......... G06F 3/0485 463/32 |
| 2012/0166668 A1 | 6/2012 | Mathews et al. |
| 2012/0233564 A1* | 9/2012 | Tsuchiya ............ A63F 13/537 715/772 |
| 2012/0242590 A1* | 9/2012 | Baccichet ........... G06F 3/0488 345/173 |
| 2012/0276997 A1* | 11/2012 | Chowdhary ........ A63F 13/213 463/31 |
| 2012/0284618 A1 | 11/2012 | Bailor et al. |
| 2012/0296909 A1 | 11/2012 | Cao et al. |
| 2012/0302352 A1* | 11/2012 | Ajami ............... H04L 67/38 463/42 |
| 2012/0309537 A1* | 12/2012 | Nogami ............ A63F 13/00 463/39 |
| 2012/0309542 A1* | 12/2012 | Nogami ............ A63F 13/12 463/42 |
| 2013/0151728 A1 | 6/2013 | Currier et al. |
| 2013/0212615 A1 | 8/2013 | Schultz et al. |
| 2013/0288789 A1* | 10/2013 | Shikata ............. A63F 13/26 463/31 |
| 2013/0312039 A1 | 11/2013 | Kuo et al. |
| 2013/0326578 A1 | 12/2013 | Blom et al. |
| 2014/0007245 A1 | 1/2014 | Bank et al. |
| 2014/0038708 A1* | 2/2014 | Davison ............ A63F 13/12 463/31 |
| 2014/0049487 A1 | 2/2014 | Konertz et al. |
| 2014/0120961 A1 | 5/2014 | Buck et al. |
| 2014/0123190 A1 | 5/2014 | Song et al. |
| 2014/0157422 A1 | 6/2014 | Livshits et al. |
| 2014/0168277 A1 | 6/2014 | Ashley et al. |
| 2014/0170979 A1 | 6/2014 | Samanta et al. |
| 2014/0181715 A1 | 6/2014 | Axelrod et al. |
| 2014/0201345 A1 | 7/2014 | Abuelsaad et al. |
| 2014/0207452 A1* | 7/2014 | Klein ............... G06F 3/167 704/235 |
| 2014/0223464 A1 | 8/2014 | Moran et al. |
| 2014/0229887 A1 | 8/2014 | Ellis et al. |
| 2014/0267911 A1 | 9/2014 | Grant et al. |
| 2014/0281012 A1 | 9/2014 | Troxler et al. |
| 2014/0282746 A1 | 9/2014 | Lin et al. |
| 2014/0354531 A1 | 12/2014 | Foreman |
| 2014/0365885 A1 | 12/2014 | Carson et al. |
| 2015/0020191 A1 | 1/2015 | Vida et al. |
| 2015/0033305 A1 | 1/2015 | Shear et al. |
| 2015/0058758 A1 | 2/2015 | Tseng |
| 2015/0089668 A1 | 3/2015 | Baldwin et al. |
| 2015/0127628 A1 | 5/2015 | Rathod |
| 2015/0150140 A1 | 5/2015 | Biswas et al. |
| 2015/0156171 A1 | 6/2015 | Biswas et al. |
| 2015/0160788 A1 | 6/2015 | Sun et al. |
| 2015/0169336 A1 | 6/2015 | Harper et al. |
| 2015/0186156 A1 | 7/2015 | Brown et al. |
| 2015/0195620 A1 | 7/2015 | Buchner et al. |
| 2015/0213800 A1 | 7/2015 | Krishnan et al. |
| 2015/0264444 A1 | 9/2015 | Wen et al. |
| 2015/0304605 A1 | 10/2015 | Shaw et al. |
| 2015/0348548 A1 | 12/2015 | Piernot et al. |
| 2015/0373065 A1 | 12/2015 | Holmquist et al. |
| 2016/0026812 A1 | 1/2016 | Kim et al. |
| 2016/0034148 A1 | 2/2016 | Wilson et al. |
| 2016/0044357 A1 | 2/2016 | Wang |
| 2016/0085430 A1 | 3/2016 | Moran et al. |
| 2016/0109941 A1 | 4/2016 | Govindarajeswaran et al. |
| 2016/0154460 A1 | 6/2016 | Von Liechtenstein |
| 2016/0162172 A1 | 6/2016 | Rathod |

(56) References Cited

U.S. PATENT DOCUMENTS

| | | | |
|---|---|---|---|
| 2016/0170730 A1 | 6/2016 | Ollikainen et al. | |
| 2016/0219338 A1 | 7/2016 | Wang et al. | |
| 2016/0232784 A1 | 8/2016 | Bineau et al. | |
| 2016/0263477 A1* | 9/2016 | Ladd | A63F 13/26 |
| 2016/0277052 A1* | 9/2016 | Sadek | H04B 1/3888 |
| 2016/0283698 A1 | 9/2016 | Huang et al. | |
| 2016/0328667 A1 | 11/2016 | Macciola et al. | |
| 2016/0358454 A1 | 12/2016 | Grove et al. | |
| 2017/0011602 A1* | 1/2017 | Brav | G08B 5/36 |
| 2017/0031575 A1 | 2/2017 | Dotan-Cohen et al. | |
| 2017/0050112 A1* | 2/2017 | Fukuda | A63F 13/52 |
| 2017/0063750 A1 | 3/2017 | Vardhan et al. | |
| 2017/0064390 A1 | 3/2017 | Kannan et al. | |
| 2017/0134822 A1 | 5/2017 | Nguyen et al. | |
| 2017/0155964 A1 | 6/2017 | Oztaskent et al. | |
| 2017/0185920 A1 | 6/2017 | Chawla et al. | |
| 2017/0187711 A1 | 6/2017 | Joo et al. | |
| 2017/0249009 A1* | 8/2017 | Parshionikar | G06F 3/0487 |
| 2018/0054688 A1 | 2/2018 | Cartwright et al. | |

OTHER PUBLICATIONS

Non-Final Office Action dated Sep. 5, 2017 in U.S. Appl. No. 15/600,563 of Roman, M. et al., filed May 19, 2017.
Non-Final Office Action dated Sep. 21, 2017 for U.S. Appl. No. 15/604,402 of Roman, M., et al. filed May 24, 2017.
Coppens, Toon et al., "AmigoTV: A Social TV Experience Through Triple-Play Convergence", Alcatel, 2005, pp. 1-10.
International Search Report and Written Opinion dated Aug. 25, 2017, for International Application No. PCT/US2017/35545, 7 pages.
Non-Final Office Action dated Aug. 4, 2017 for U.S. Appl. No. 15/587,201 of M. Roman et al., filed May 4, 2017.
U.S. Appl. No. 15/587,201 of M. Roman et al., filed May 4, 2017.
U.S. Appl. No. 15/599,398 of Roman, M. et al. filed May 18, 2017.
U.S. Appl. No. 15/600,563 of Roman, M. et al. filed May 19, 2017.
U.S. Appl. No. 15/604,402 of Roman, M. et al. filed May 24, 2017.
U.S. Appl. No. 15/673,911 of Roman, M. et al. filed Aug. 10, 2017.
Final Office Action dated Apr. 24, 2018 for U.S. Appl. No. 15/587,201 of M. Roman et al., filed May 4, 2017.
First Office Action dated Feb. 19, 2018 for Austrian Patent Application No. A9001/2017, 7 pages.
First Office Action dated Feb. 8, 2018 for Austrian Patent Application No. GM9001/2017, 9 pages.
International Search Report and Written Opinion dated Feb. 13, 2018 for International Application No. PCT/US18/13350, 9 pages.
Non-Final Office Action dated Feb. 16, 2018 for U.S. Appl. No. 15/673,911 of Roman, M. et al. filed Aug. 10, 2017.
Mills, Adam, "Translating Home Assistant", [Internet] Accessed on Jan. 16, 2018: https://home-assistant.io/blog/2017/11/05/frontend-translations/>>, May 11, 2017, 4 pages.
Schiller, Kai, "L.U.C.Y.—Home Assistant with touch screen and facial recognition", [Internet] Accessed on Jan. 16, 2018: <<https://www.homeandsmart.de/lucy-home-assistant-with-touchscreen-and-face-recognition>>, Aug. 22, 2016, 6 pages.
Non-Final Office Action dated Oct. 20, 2017 for U.S. Appl. No. 15/599,398 of Roman, M., et al., filed May 18, 2017.
Final Office Action dated Jul. 5, 2018 for U.S. Appl. No. 15/604,402 of Roman, M., et al. filed May 24, 2017.
Final Office Action dated Jun. 20, 2018 for U.S. Appl. No. 15/600,563 of Roman, M., et al. filed May 19, 2017.
Final Office Action dated May 11, 2018 for U.S. Appl. No. 15/599,398 of Roman, M. et al. filed May 18, 2017.
Office Action dated Apr. 20, 2018 in Austrian Patent Application No. GM9001/2017, 5 pages.
Office Action dated Jul. 10, 2018 in Taiwan Patent Application No. 106118485, 23 pages.
"Microsoft Computer Dictionary", Fifth edition, Microsoft Press, Microsoft Corporation, 2002, 3 pages.
Galitz, Wilbert O., "The Essential Guide to User Interface Design", Second Edition, John Wiley & Sons, Inc., New York, 2002, 38 pages.

\* cited by examiner

US 10,166,465 B2

CONTEXTUAL USER INTERFACE BASED ON VIDEO GAME PLAYBACK

CLAIM FOR PRIORITY

This application is a continuation-in-part of U.S. patent application Ser. No. 15/604,402, entitled "Contextual User Interface Based on Shared Activities," by Roman et al., and filed on May 24, 2017. U.S. patent application Ser. No. 15/604,402 is a continuation-in-part of U.S. patent application Ser. No. 15/600,563, entitled "Contextual User Interface Based on Media Playback," by Roman et al., and filed on May 19, 2017. U.S. patent application Ser. No. 15/600,563 claims priority to U.S. Provisional Patent Application No. 62/506,168, entitled "Contextual User Interface Based on Media Playback," by Roman et al., and filed on May 15, 2017, and is also a continuation-in-part of U.S. patent application Ser. No. 15/587,201, entitled "Contextual User Interface Based on Environment," by Roman et al., and filed on May 4, 2017, which claims priority to U.S. Provisional Patent Application No. 62/448,912, entitled "Contextual User Interface Based on Environment," by Roman et al., and filed on Jan. 20, 2017, U.S. Provisional Patent Application No. 62/486,359, entitled "Contextual User Interface Based on Environment," by Roman et al., and filed on Apr. 17, 2017, and U.S. Provisional Patent Application No. 62/486,365, entitled "Contextual User Interface Based on Changes in Environment," by Roman et al., and filed on Apr. 17, 2017. The content of the above-identified applications are incorporated herein by reference in their entirety.

TECHNICAL FIELD

This disclosure relates to user interfaces, and in particular a user interface that is adaptive based on the context of the environment.

BACKGROUND

The Internet of Things (IoT) allows for the internetworking of devices to exchange data among themselves to enable sophisticated functionality. For example, devices configured for home automation can exchange data to allow for the control and automation of lighting, air conditioning systems, security, etc. In the smart home environment, this can also include home assistant devices providing an intelligent personal assistant to respond to speech. For example, a home assistant device can include a microphone array to receive voice input and provide the corresponding voice data to a server for analysis to provide an answer to a question asked by a user. The server can provide that answer to the home assistant device, which can provide the answer as voice output using a speaker. As another example, the user can provide a voice command to the home assistant device to control another device in the home, for example, a command to turn a light bulb on or off. As such, the user and the home assistant device can interact with each other using voice, and the interaction can be supplemented by a server outside of the home providing the answers. However, homes can have different users interacting with the home assistant device within different contextual environments (e.g., from different locations and at different times) within the home.

SUMMARY

Some of the subject matter described herein includes a method including receiving video game state information indicating a state of playback of a video game on a video game console. An assistant device can determine that the state of the playback of the video game includes a player character controlled by a user. The player character can have characteristics based on the playback of the video game. The home assistant device can then generate a first button on a graphical user interface (GUI) displayed upon a display of the assistant device, the first button providing an indication of a first action that can be performed by the video game to modify the characteristics of the player character. The home assistant device can then determine that the first button was selected and instruct the video game console to modify the characteristics of the player character corresponding to the first action upon selection of the first button.

In some implementations, the method includes determining characteristics of the user while playing the video game. An audio regarding the generation of the first button based on the characteristics of the user can be provided.

In some implementations, the characteristics of the user include visual characteristics of the user while playing the video game.

In some implementations, the characteristics of the user include audio characteristics of the user while playing the video game.

In some implementations, the method includes receiving graphical content related to similar subject matter of the video game being played back on the video game console. The assistant device can then display the graphical content on the GUI with the first button.

In some implementations, the method includes generating a second button on the GUI, the second button providing an indication of a second action that can be performed by the video game to modify the characteristics of the player character, the characteristics modified by the second action being different than the characteristics modified by the first action. Whether the second button was selected can be determined, and that can cause the home assistant device to instruct the video game console to modify the characteristics of the player character upon selection of the second button.

In some implementations, the method includes determining that the video game state information indicates that a change in the playback of the video game is about to occur, wherein characteristics of the first button and the second button are based on the change in the playback of the video game that is about to occur.

In some implementations, the method includes determining that the video game state information indicates that a change in the playback of the video game is about to occur, wherein the first button is generated based on the change in the playback of the video game that is about to occur.

Some of the subject matter described herein also includes a computer program product, comprising one or more non-transitory computer-readable media having computer program instructions stored therein, the computer program instructions being configured such that, when executed by one or more computing devices, the computer program instructions cause the one or more computing devices to: receive video game state information representing a state of playback of a video game on a video game console and determine that the state of the playback of the video game includes a player character controlled by a user, the player character having characteristics based on the playback of the video game. This can result in the generation of a first button on a graphical user interface (GUI), the first button providing an indication of a first action that can be performed by the video game to modify the characteristics of the player character. The video game console can be instructed to modify the characteristics of the player character corresponding to the first action upon selection of the first button upon selection of the first button.

In some implementations, the computer program instructions cause the one or more computing devices to: determine characteristics of the user while playing the video game; and provide an audio indication regarding the generation of the first button based on the characteristics of the user.

In some implementations, the characteristics of the user include visual characteristics of the user while playing the video game.

In some implementations, the characteristics of the user include audio characteristics of the user while playing the video game.

In some implementations, the computer program instructions cause the one or more computing devices to: receive graphical content related to similar subject matter of the video game being played back on the video game console; and display the graphical content on the GUI with the first button.

In some implementations, the computer program instructions cause the one or more computing devices to: generate a second button on the GUI, the second button providing an indication of a second action that can be performed by the video game to modify the characteristics of the player character, the characteristics modified by the second action being different than the characteristics modified by the first action; determine that the second button was selected; and instruct the video game console to modify the characteristics of the player character upon selection of the second button.

In some implementations, the computer program instructions cause the one or more computing devices to determine that the video game state information indicates that a change in the playback of the video game is about to occur, wherein characteristics of the first button and the second button are based on the change in the playback of the video game that is about to occur.

In some implementations, the computer program instructions cause the one or more computing devices to determine that the video game state information indicates that a change in the playback of the video game is about to occur, wherein the first button is generated based on the change in the playback of the video game that is about to occur.

Some of the subject matter described herein also includes an electronic device, comprising: one or more processors; and memory storing instructions, wherein the processor is configured to execute the instructions such that the processor and memory are configured to determine a state of a playback of a game corresponding to a game console and generate a first button on a graphical user interface (GUI), the first button providing an indication of a first action that can be performed by the game to adjust the playback of the game. Upon a determination that the first button was selected, the electronic device can instruct the game console to adjust the playback of the game corresponding to the first action upon selection of the first button.

In some implementations, the processor is configured to execute the instructions such that the processor and memory are configured to determine characteristics of a user while playing the game; and provide an audio indication regarding the generation of the first button based on the characteristics of the user.

In some implementations, the characteristics of the user include visual characteristics of the user while playing the game.

In some implementations, the characteristics of the user include audio characteristics of the user while playing the game.

In some implementations, the processor is configured to execute the instructions such that the processor and memory are configured to: receive graphical content related to similar subject matter of the game being played back; and display the graphical content on the GUI with the first button.

In some implementations, the processor is configured to execute the instructions such that the processor and memory are configured to generate a second button on the GUI, the second button providing an indication of a second action that can be performed by the game to modify the playback, the first action and the second action modifying the playback differently; determine that the second button was selected; and instruct the game console to modify the characteristics of the playback of the game upon selection of the second button.

In some implementations, the processor is configured to execute the instructions such that the processor and memory are configured to determine that the state of the playback of the game indicates that a change in the playback of the game is about to occur, wherein characteristics of the first button and the second button are based on the change in the playback of the game that is about to occur.

In some implementations, the processor is configured to execute the instructions such that the processor and memory are configured to determine that the state of the playback of the game indicates that a change in the playback of the game is about to occur, wherein the first button is generated based on the change in the playback of the game that is about to occur.

Some of the subject matter described herein also includes a method for providing a graphical user interface (GUI) on a touchscreen of a home assistant device with artificial intelligence (AI) capabilities, the GUI providing content related to playback of a video game within an environment of the home assistant device. The method includes receiving video game state information from a video game console, the video game state information indicating a state of playback of a video game within the environment. It can be determined that the video game state information indicates that the state of the playback of the video game includes a player character controlled by a user having a health status approaching a level that results in termination of a current iteration of the playback of the video game, and that the video game state information indicates that an item controlled by the player character has an inventory level approaching a level that results in the item not being functional until the inventory level is replenished. Thus, a first hot button can be generated for display on the GUI of the touchscreen of the home assistant device based on the determination that the state of the playback of the video game includes a player character controlled by a user having a health status approaching a level that results in termination of a current iteration of the playback of the video game, the first hot button configured to instruct the video game console to use an item or ability corresponding to the player character to modify the health status such that it adjusted to a modified level away from the level that results in termination of the current iteration of the playback of the video game. A second hot button can be generated for display on the GUI of the touchscreen of the home assistant device based on the determination that the video game state information indicates that an item controlled by the player character has an inventory level approaching a level that results in the item not being functional until it is replenished, the second hot button configured to instruct the video game console to use an item or ability corresponding to the player character to modify the inventory level such that it is adjusted to a modified inventory level away from the level that results in the item not being functional. It can be determined that the first hot button or the second hot button was selected via a touch on the touchscreen of the home assistant device. This results in instructing the video game console to modify the health status or modify the inventory level based on the selection of the first hot button or the second hot button.

DETAILED DESCRIPTION

Figure 1:
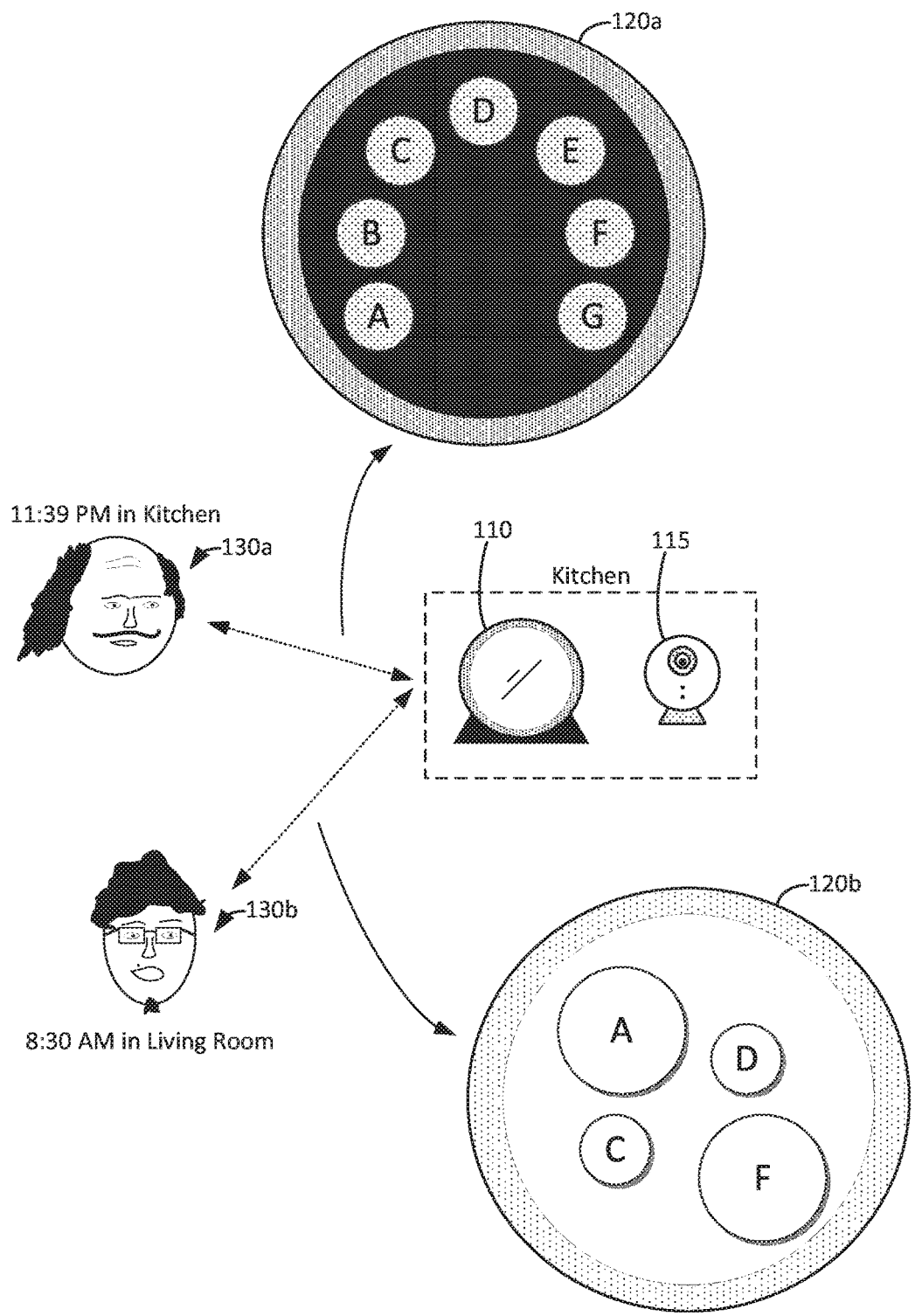
FIG. 1 illustrates an example of an assistant device providing a user interface based on the context of the environment.

This disclosure describes devices and techniques for providing a user interface for a home assistant device based on the context, or characteristics, of its surrounding environment. In one example, the user interface of the home assistant device (e.g., a graphical user interface (GUI) generated for display on a display screen of the home assistant device) can be different based on a combination of contextual factors of the surrounding environment including the person interacting with the home assistant device, the people in the surrounding environment, the time, the location of the home assistant device within the home, the location of the person interacting with the home assistant device, the presence of strangers, interests of the users, etc. As a result, based on the contextual factors, different content (e.g., information, graphical icons providing access to functionality of the home assistant device, etc.) can be displayed by the home assistant device.

Additionally, the same content can be displayed differently. For example, different languages, visual effects, etc. can be provided based on the context of the environment. In another example, two different users (or even the same user at different times) might ask the same question to the home assistant device. Based on differences within the context of the environment when the question is asked, the user interface can provide the same answers to the question differently.

This disclosure also describes devices and techniques for providing a user interface based on playback of media content within the environment. In one example, the home assistant device can determine that a user is switching among different television channels to watch different media content. For example, the user might switch between two different channels of the television using a remote control, each of the different channels providing playback of different media content based on the user's cable television package. When the user switches the channels, the remote control can generate and transmit infrared (IR) light (e.g., using a light-emitting diode (LED)) that can be received by the television (e.g., using a photodiode) to cause it to change channels. The home assistant device can also detect the transmission of IR light as signals (based on pulses of the IR light) indicating the channel that the television is to switch to. Thus, the home assistant device can determine that the user is toggling between the two channels, and provide information regarding the channels that are being watched (i.e., toggled among) to a server. That server can then determine information regarding the channels that are being watched (e.g., if one or both of the two channels is playing back a basketball game, then the teams that are playing, the current score, or other information regarding the media content being played back) and provide that information to the home assistant device. Additionally, information regarding other channels that might be of interest to the user (e.g., other channels that are playing back similar or related content such as another basketball game) can be provided as well.

The home assistant device can then generate "hot buttons" on a GUI providing information regarding the media content played back on channels that are currently not being watched and allowing the user to quickly change the television to that channel. For example, one of the hot buttons can display the score, team names, and time left for a basketball game that is playing back on a channel that the user was previously watching. Thus, the user can be provided information related to the other channels. If the user wants to quickly switch to a channel due to the information provided on the hot button, then the user can quickly and easily select the button (e.g., touch the button on a touchscreen display of the home assistant device), and the home assistant device can transmit the IR signals to the television to emulate the remote control such that the channel can be changed.

This disclosure also describes devices and techniques for providing a user interface based on shared activities within different environments. In one example, two different friends (or other types of users such as family members, colleagues, etc.) can have their own home assistant devices within their separate homes. The home assistant devices can determine information regarding the activities being performed within the homes and provide that information to a server. That server can determine that the friends are engaged in a similar activity and then recommend that the friends engage in a video chat to create a more social experience within the home. For example, the home assistant devices in the different homes can determine television channels being watched within their home. Information indicating the television channels can then be provided to the server, which can determine similarities between the television channels, representing that the friends are engaged in not only watching television, but also watching similar television channels. The server can then provide video and audio data such that the friends can talk to each other via a video chat using their home assistant devices.

Additionally, the home assistant devices can generate hot buttons on a GUI displayed on its display screen, as discussed above. One hot button can include the video content for the video chat. The user can select that hot button (e.g., by touching a touchscreen display of the home assistant device) to have the video chat then occupy more of the display screen (e.g., displayed in the background of the display screen with other hot buttons providing information regarding channels as discussed above), or the video chat can then be displayed on the television. This can result in a new hot button being generated and displayed for the television channel that was being watched before switching the video chat to the television.

This disclosure also describes devices and techniques for providing a user interface based on playback of video games within the environment. In one example, the home assistant device can receive information from a video game console regarding characteristics of the playback of a video game. For example, the home assistant device can receive information regarding the progress of the user towards completion of the video game, characteristics regarding the player character controlled by the user during the playback of the video game (e.g., the health, inventory, etc. of the user's player character), upcoming or future events that will occur during the playback of the video game, etc. The home assistant device can analyze this information and then generate hot buttons (similar to the examples discussed above) on a GUI of the touchscreen of the home assistant device. The user can select these hot buttons and cause the home assistant device to provide control information to the video game console such that related actions can be performed. For example, if the player character's health is reaching a point when a current iteration of the playback might end (e.g., the user's player character dies), then the home assistant device can generate a hot button which can be selected by the user and cause the video game console to perform some action within the video game, for example, increase the player character's health. Thus, the user's playback of the video game can be supplemented with the home assistant device.

Additionally, the home assistant device can provide an audio response based on the playback of the video game. For example, the home assistant device can provide feedback in the form of speech or voice to indicate to the user that the hot button has been generated. This can allow the user to be aware of the hot button and allows the user to quickly select the hot button and have the corresponding action be performed in the video game. In another example, audio or video recordings of the user can be analyzed to determine how to provide the hot buttons on the GUI and/or whether to provide an audio response.

In more detail, FIG. 1 illustrates an example of an assistant device providing a user interface based on the context of the environment. In FIG. 1, home assistant device 110 can include a microphone (e.g., a microphone array) to receive voice input from users and a speaker to provide audio output in the form of a voice (or other types of audio) to respond to the user. Additionally, home assistant device 110 can include a display screen to provide visual feedback to users by generating a graphical user interface (GUI) providing content for display. For example, a user can ask home assistant device 110 a question and a response to that question can be provided on the display screen. Additional visual components, such as light emitting diodes (LEDs), can also be included. As a result, the user interface can include audio, voice, display screens, lighting, and other audio or visual components. In some implementations, camera 115 can also be included for home assistant device 110 to receive visual input of its surrounding environment. Camera 115 can be physically integrated (e.g., physically coupled with) with home assistant device 110 or camera 115 can be a separate component of a home's wireless network that can provide video data to home assistant device 110.

In FIG. 1, home assistant device 110 can be in a particular location of the home, for example, the kitchen. Different users might interact with home assistant device from different locations within the home (e.g., the kitchen or the living room) and at different times. Additionally, the different users might be interested in different features, functionalities, or information provided by home assistant device 110. These different contextual factors of the environment of home assistant device 110 can result in the user interface of home assistant device 110 to be changed. Because the user interface can provide content such as features, functionalities, information, etc., this can result in different content being displayed on the display screen. That is, different combinations of contextual factors of the environment can result in a different user interface of home assistant device 110, resulting in an adaptive user interface based on context of the environment. The contextual factors can also include demographics of the users. For example, if a child is using home assistant device 110 then the content provided can be different than if an adult is using home assistant device 110 (e.g., provide kid-friendly content).

For example, in FIG. 1, user 130a can be in the kitchen (i.e., in the same room or within close proximity with home assistant device 110) at 11:39 PM in the evening. Home assistant device 110 can recognize user 130a, for example, using video input from camera 115 to visually verify user 130a. In another example, home assistant device 110 can recognize user 130a through speech recognition as user 130a speaks either to home assistant device 110, to other people, or even himself. User 130a can also have had previous interactions with home assistant device 110, and therefore, home assistant device 110 can remember the likes or preferences, expectations, schedule, etc. of user 130a. As a result, user interface 120a can be generated for user 130a to interact with home assistant device 110 based on the current context of the environment indicating the user, time, and location that the user is speaking from.

By contrast, user 130b can be in the living room at 8:30 AM of the same home as home assistant device 110. Because the user, time, and location of the user are different, home assistant device 110 can generate a different user interface 120b providing a different GUI having different content as depicted in FIG. 1. As a result, user interface 120b can be different from user interface 120a because they are provided, or generated, in response to different contextual environments when users 130a and 130b speak. This can occur even if the content of the speech provided by users 130a and 130b is similar, or even the same. For example, if both users 130a and 130b ask the same or similar question (e.g., their speech includes similar or same content such as asking for a list of new restaurants that have opened nearby), the user interface (to respond to the question) that is provided by home assistant device 110 can be different because of the different context of the environments when the speech was spoken. Additionally, the users might have different interests (e.g., as indicated by a profile) which can also result in different content providing different services, functionalities, etc.

In another example, because user interface 120a was generated in the evening, it can have different colors, brightness, or other visual characteristics than display 120b. This might be done because the user interface should not be too disruptive in different lighting situations. For example, a light sensor (e.g., a photodiode) can be used to determine that a room is dark. Home assistant device 110 can then adjust the brightness of the display screen based on the determined lighting situation in the environment.

Additionally, because users 130a and 130b are in different rooms and, therefore, at different distances from home assistant device 110, the user interfaces 120a and 120b can be different to take that into account. For example, because user 130a in FIG. 1 is in the kitchen, he may be relatively close to home assistant device 110 and, therefore, the size of some of the content (e.g., items A-G which can be buttons, icons, text, etc.) of a GUI provided as user interface 120a can be relatively small. By contrast, because user 130b is in the living room (i.e., farther away from home assistant device 110 than user 130a), some of the content of user interface 120b can be larger so that they can be more easily seen from a distance. For example, in FIG. 1, icons A and F have different sizes among the different user interfaces 120a and 120b. That is, content such as the items of the user interfaces that provide access to the same functionality or provide an indication to the same type of information can be be different sizes because the contextual environments are different. For example, if users 130a and 130b request a listing of new, nearby restaurants, icons A-G might represent a list of some of the identified restaurants. Additionally, the playback of audio can be at a volume based on the distance that a user is from home assistant device 110. For example, a user that is farther away can result in the playback of audio that is at a higher volume than if a user is closer to home assistant device 110.

User interfaces 120a and 120b can also be different in other ways. For example, the location of content, the number of content, etc. as depicted in FIG. 1 can also be different due to the different contextual environments.

Figure 2:
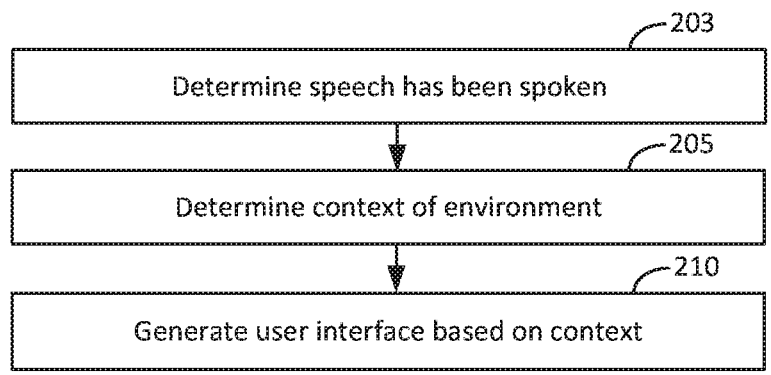
FIG. 2 illustrates an example of a block diagram providing a user interface based on the context of the environment.

FIG. 2 illustrates an example of a block diagram providing a user interface based on the context of the environment. In FIG. 2, at block 203, speech can be determined to have been spoken. For example, a microphone of home assistant device 110 can pick up speech spoken within the environment. That speech can be converted into voice data and analyzed by a processor of home assistant device 110 to determine that speech has been received. At block 205, the context of the surrounding environment or vicinity around home assistant device 110 can be determined. For example, home assistant device 110 can determine any of the aforementioned details regarding the environment in the physical space around home assistant device 110 including time, user, prior interactions with the user, locations of the user and home assistant device 110, etc. Any of the details discussed below can also be determined. At block 210, the user interface can be provided or generated based on the determined context and content of the speech. For example, this can include generating a GUI with content related to the content of the speech and provided at various sizes, colors, etc. on a display screen of home assistant device 110 based on the context. In some implementations, the user interface can also include playback of audio (e.g., sounds), turning on various lighting effects (e.g., LEDs), etc. For example, different GUIs with different audio effects can be provided.

Next, home assistant device 110 can pick up more speech at a different time. However, if the context of the environment is different, then a different user interface than that generated at block 210 can be generated. Thus, even if the content of the speech at the two different times was the same, the user interfaces generated can be different if the context of the environment was different.

Figure 3:
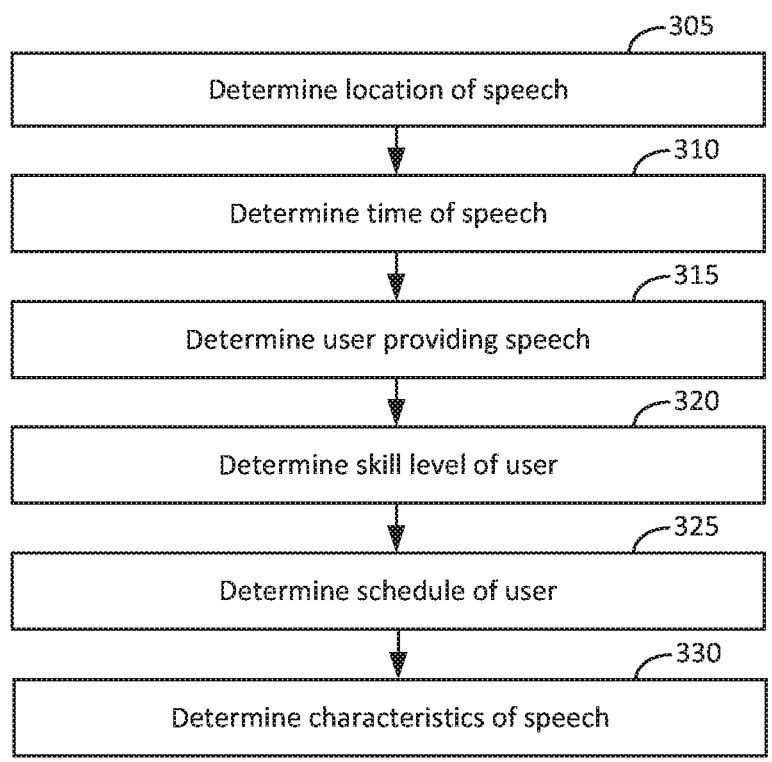
FIG. 3 illustrates an example of a block diagram determining the context of the environment of an assistant device.

FIG. 3 illustrates an example of a block diagram determining the context of the environment of an assistant device. In FIG. 3, as previously discussed, the location of the speech can be determined at block 305, the time of the speech can be determined at block 310, and the user providing speech can be determined at block 315 to determine the context of the environment.

Other details can include the skill level of the user at block 320. For example, home assistant device 110 can determine the skill level of a user as they interact more with the user interface. If the user uses more functionality, more complicated functionality, requests significant amount of detail regarding functionality, etc. then the user can be identified by home assistant device 110 as a more sophisticated user. By contrast, if another user tends to ask the same repetitive tasks or questions of home assistant device 110 then the user can be identified as a less sophisticated user. If the user tends to use less complicated functionality, less functionality, or does not request significant detail, then the user can also be identified as a less sophisticated user. In FIG. 1, user 130a can be a more sophisticated user indicating that the user has a relatively high skill level in using home assistant device 110, and therefore, more functionality (or content) can be provided on user interface 120a (i.e., items A-G are provided). By contrast, user 130b can be a less sophisticated user indicating that the user has a relatively lower skill level (than user 130a), and therefore, less content can be provided on user interface 120b (i.e., fewer items A, C, D, and F are provided). In some implementations, the same number of content of user interfaces might be provided, but different content corresponding to different functionalities or features might be displayed based on the skill level of the user. Thus, different content can be provided in a user interface of home assistant device 110.

As previously discussed, the user interface can include other visual components other than displaying content as part of a GUI on a display screen. In FIG. 1, this can include lighting, for example, LEDs or other types of lights which can be activated by being turned on, glow, flicker, display a particular color, etc. to provide an indication to a user of a situation. For example, home assistant device 110 can determine a user's schedule at block 325 and provide an indication as to when the user should be leaving the home so that they can maintain that schedule without any tardiness. In FIG. 1, this can result in a ring around the display screen that can be different colors (e.g., implemented with LEDs or other types of lighting), however in other implementations the ring can be part of the display screen itself.

In one example, the ring can be a color corresponding to the traffic or commute status for the user to go to their next expected location, such as the workplace in the morning or a coffee meeting scheduled on their calendar. If the ring is set to a green color, then this can indicate to the user that the traffic is relatively light. By contrast, a red color can indicate that the traffic is relatively heavy. This type of user interface can provide a user with information while they are far away from home assistant device 110 because the colors can be easily seen from a distance. In some implementations, the ring can also indicate whether the user needs to leave soon or immediately if they want to make the next appointment on their schedule. For example, the intensity or brightness of the color can be increased, the ring can be blinking, etc. This can provide further detail from a distance for a user. In some implementations, the user interface can also display on the display screen a route to the location of the next event on their schedule, provide a time estimate, etc. As a result, if the user decides that they want more detail and walks closer to home assistant device 110, information can be readily displayed and available. In some implementations, home assistant device 105 can determine that the user is walking closer after the ring has been activated and then process information and display the additional information on the display screen so that information is available when they are closer. In some implementations, the color of the ring can indicate other determinations, for example, an unexpected situation such as a window or door being open, water flooding detected, or the temperature is within a temperature range corresponding to an anomaly.

The user interface can also include audio sounds for playback. For example, user interface 120a in FIG. 1 might play back one type of audio sound when user 130a interacts with it, for example, selecting one of the items A-G, requesting user interface 120a to change (e.g., provide new content), etc. By contrast, user interface 120b might play back different sounds for the same interactions by user 130b because of the different context of the environment.

Characteristics regarding the speech received by home assistant device 110 can also be determined at block 330. For example, home assistant device 110 can determine the volume, speed, accent, language, tone, etc. of speech and use that as a contextual factor in providing a user interface. In one example, if a user is speaking quickly (e.g., at a speed or rate determined to be within a words per minute range corresponding to speaking quickly), then content of the user interface may be updated faster than if the user was speaking slowly, for example, by updating the GUI of the user interface sooner. In another example, if the user's speech is determined to be indicative of stress or frustration, then the user interface might provide content differently than if the user's speech is determined to be relatively free of stress or frustration. As an example, if the user is stressed or frustrated, then the amount of content provided on the user interface can be reduced in comparison with the user not being stressed or frustrated.

In some implementations, if the user is determined to be stressed or frustrated, then the user interface can include the playback of music. For example, calming music can be played back using the speaker of home assistant device 110.

In some implementations, the lighting of home assistant device 110 can be different based on what is provided on the user interface. For example, different types of content can result in different brightness, colors, etc.

Figure 4:
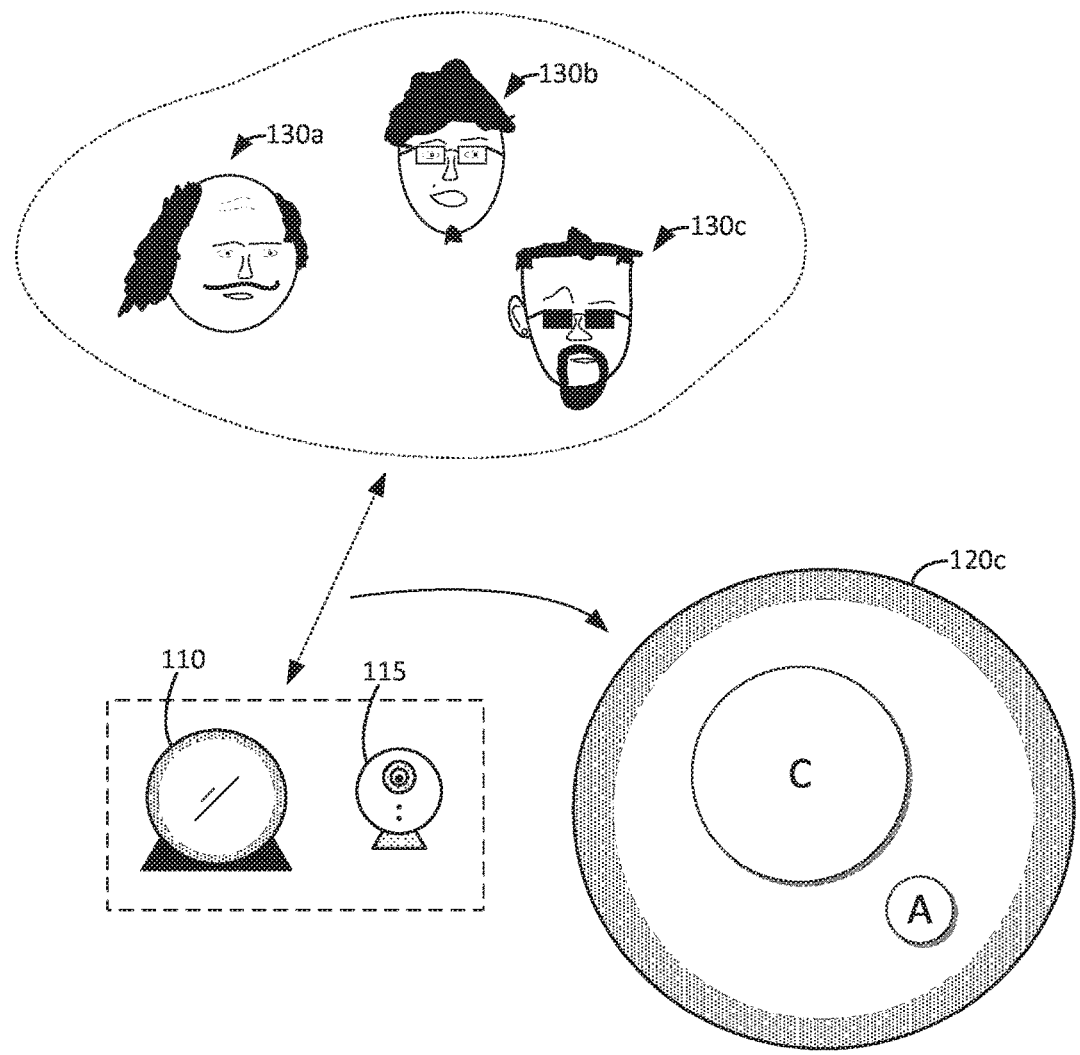
FIG. 4 illustrates another example of an assistant device providing a user interface based on the context of the environment.

The user interface can also be changed to account for privacy expectations of a user when the context of the environment changes (i.e., the conditions or characteristics of the environment change). FIG. 4 illustrates another example of an assistant device providing a user interface based on the context of the environment. In FIG. 4, users 130a, 130b, and 130c are within the home environment of home assistant device 110. These different users can be identified and the user interface 120c in FIG. 4 can be generated to take into account privacy concerns of the various users.

For example, user 130a might want some content to be provided on a user interface if he is alone, but might not want that content to be displayed if others are within the home. Likewise, user 130b also might not want some content to be provided. In some implementations, user 130a might find it acceptable to have the content provided on the user interface even if the presence of user 130b is detected because user 130b is a member of the same household. However, user 130a might want that content to not be displayed if strangers or guests are in the home. User 130c can be a stranger or newcomer into the home environment and has never interacted with home assistant device 110 and therefore, is unrecognized by home assistant device 110.

Home assistant device 110 can recognize the different users or persons within the home and generate user interface 120c based on the users 130a-c. For example, home assistant device 110 can take some details of user interfaces 120a and 120b (e.g., user interfaces normally for users 130a and 130b, respectively) and generate user interface 120c in FIG. 4 based on those other user interfaces. That is, user interface 120c can be generated based on how user interfaces would be generated for users 130a and 130b. In FIG. 4, this results in some content of user interface 120b having a relatively large size (e.g., as in user interface 120b), but less content than either user interfaces 120a or 120b. In some implementations, content that would mutually exist in user interfaces 120a and 120b can be provided within user interface 120c, but content that is only on one of user interfaces 120a and 120b might not be provided because it might only appeal to a single user or those users might have different privacy expectations. For example, item B as depicted in user interface 120a in FIG. 1 might not appear because it is not provided within user interface 120b in FIG. 1.

In some implementations, upon detection of user 130c (i.e., a stranger or guest in the environment), the user interface can also be adapted to take into account an unrecognized user. For example, upon detection of an unrecognized user, some content might be removed from a user interface. When the unrecognized user leaves, this can be detected, and therefore, home assistant device 110 can then provide the removed content back with the user interface. As a result, the user's privacy expectations can be maintained when guests are nearby.

Other types of changes in context of the environment other than detection of strangers or guests can include determining differences in time. For example, a user might find it acceptable to display some content on the GUI late at night or early in the morning, but might not want that content displayed during the daytime because the likelihood of others seeing that content might be higher. Another example can include activities of persons within the environment. For example, if several people in the environment are discussing a particular topic, a social gathering is taking place, etc. then perhaps a user's privacy expectations can be elevated and, therefore, some of the content that would otherwise be displayed can be removed.

In some implementations, a user's privacy expectations can be set by that user or learned by home assistant device 110 over time, or a combination of both. For example, the user can indicate that certain content should not be displayed when unrecognized persons are in the environment. As another example, the user might remove content from the GUI and home assistant device 110 can identify the context in the environment when the user removed the content to determine the user's privacy expectations.

Figure 6:
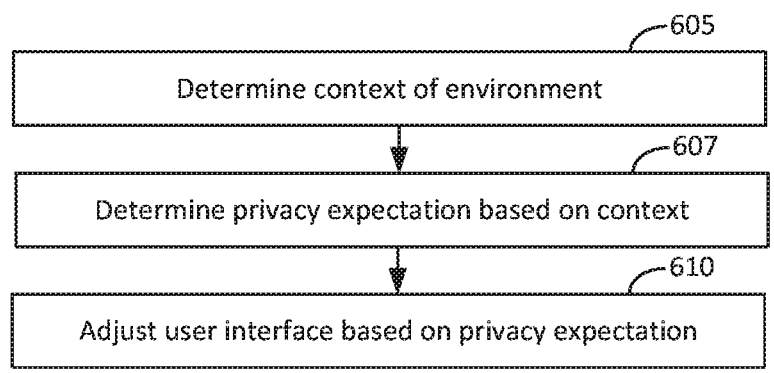
FIG. 6 illustrates an example of a block diagram for adjusting a user interface to maintain privacy expectations.

FIG. 6 illustrates an example of a block diagram for adjusting a user interface to maintain privacy expectations. In FIG. 6, at block 605, the context of the environment can be determined. For example, the presence of persons including recognized users and/or strangers, the time, activities being performed in the environment, etc. can be determined.

At block 607, privacy expectations for a user based on the context can be determined. For example, if a user is within the environment, a GUI providing various content can be provided. However, if strangers or guests are detected within the environment, the user might not want certain content displayed on the GUI due to an increase in privacy concerns resulting in higher privacy expectations for that content. Thus, at block 610, the GUI can be adjusted or modified based on the privacy expectations. For example, the content can be removed due to the increase in privacy expectations while the stranger or guest is present within the environment.

When the stranger or guest leaves, this can be determined as a change in the context of the environment and, therefore, also a change in the privacy expectations for the user. Because the user might be the only person within the environment, the GUI can be modified again to include the content that was previously removed. Thus, if the context of the environment changes and, therefore, the user for whom the GUI is provided has a change in privacy expectations, then the GUI can be adapted.

Many of the examples disclosed herein discuss visual adaptations for the user interface. However, audio adaptations can also be performed based on the context situations described above. For example, the type of voice, accent, volume, etc. can also be adjusted for different user interfaces using the techniques described herein.

Many of the examples disclosed herein discuss speech being recognized. However, other types of audio can also be used with the techniques. For example, noise from objects such as television or radio, a doorbell ringing, a door opening, glass shattering, etc. can also be detected occurrences of activity other than speech.

In some implementations, the content of the user interface can also be changed based on whether or not it is determined that a user is looking at home assistant device 110 or speaking to home assistant device 110. For example, the display screen of home assistant device 110 might be turned off, but can turn on when it is determined that a user is looking at it.

In some implementations, the volume of playback of audio provided by home assistant device 110 can be adjusted (e.g., lowered) upon detection of an incoming phone call or page (e.g., via a mobile phone within the home environment). In another example, the content displayed can be adjusted based on the status of another device. For example, a recipe displayed on the display screen of home assistant device 110 can be changed based on determined statuses of a kitchen appliance (e.g., oven, timer, etc.) used for the recipe.

In some implementations, the content provided via the user interface can be based on how a user is using another device within the home. For example, the infrared signals of a television and/or remote control of the television can be detected to indicate which channels are being switched among. This information can be provided to a cloud server by home assistant device 110, which can provide home assistant device 110 with information regarding the media content on those channels being watched. For example, the media content to be provided via the user interface can include "hot buttons" that can show information regarding the channels (e.g., schedule, current programming, popularity ratings for what is currently being played on the channel, etc.). In another example, if a channel is determined to be playing a sports game, then the score, team information (e.g., team rosters) can be displayed. In some implementations, if the user is determined to be switching between three channels within a short period of time and repeating some of the channels during that short period of time (e.g., each channel is visited at least twice in a five minute period), then hot buttons can be generated for each of those channels. The hot buttons can be displayed in different parts of the display screen and each button can include content representing information corresponding to the channel. For example, the user can be switching between three channels playing three different basketball games. Each of the hot buttons can include the scores and time (e.g., 3:23 left in the fourth quarter) of the game played on that channel. Thus, switching between the different channels can be determined and content for the channels that aren't even being watched can be displayed via the hot buttons. The user can then select one of those buttons and the television can switch to the channel corresponding to the selected button. This can be done with home assistant device 110 communicating with the television either via the wireless network or by generating infrared signals to simulate a remote control.

In more detail, home assistant device 110 can be placed within the home where it is easily accessible to users and the user interface displayed on its display screen is easily seen. For example, some users might place home assistant device 110 in the living room where they also watch media content played back on their television, engage in social activities, etc. Thus, home assistant device 110 might be placed on a coffee table or end table in the living room where it is close to where people are engaged in a variety of activities in the home. In some implementations, home assistant device 110 can determine information regarding the playback of media content on the television (or other display device such as a computer monitor, tablet, smartphone, etc.) and then generate content for its user interface based on the playback of the media content.

Figure 7:
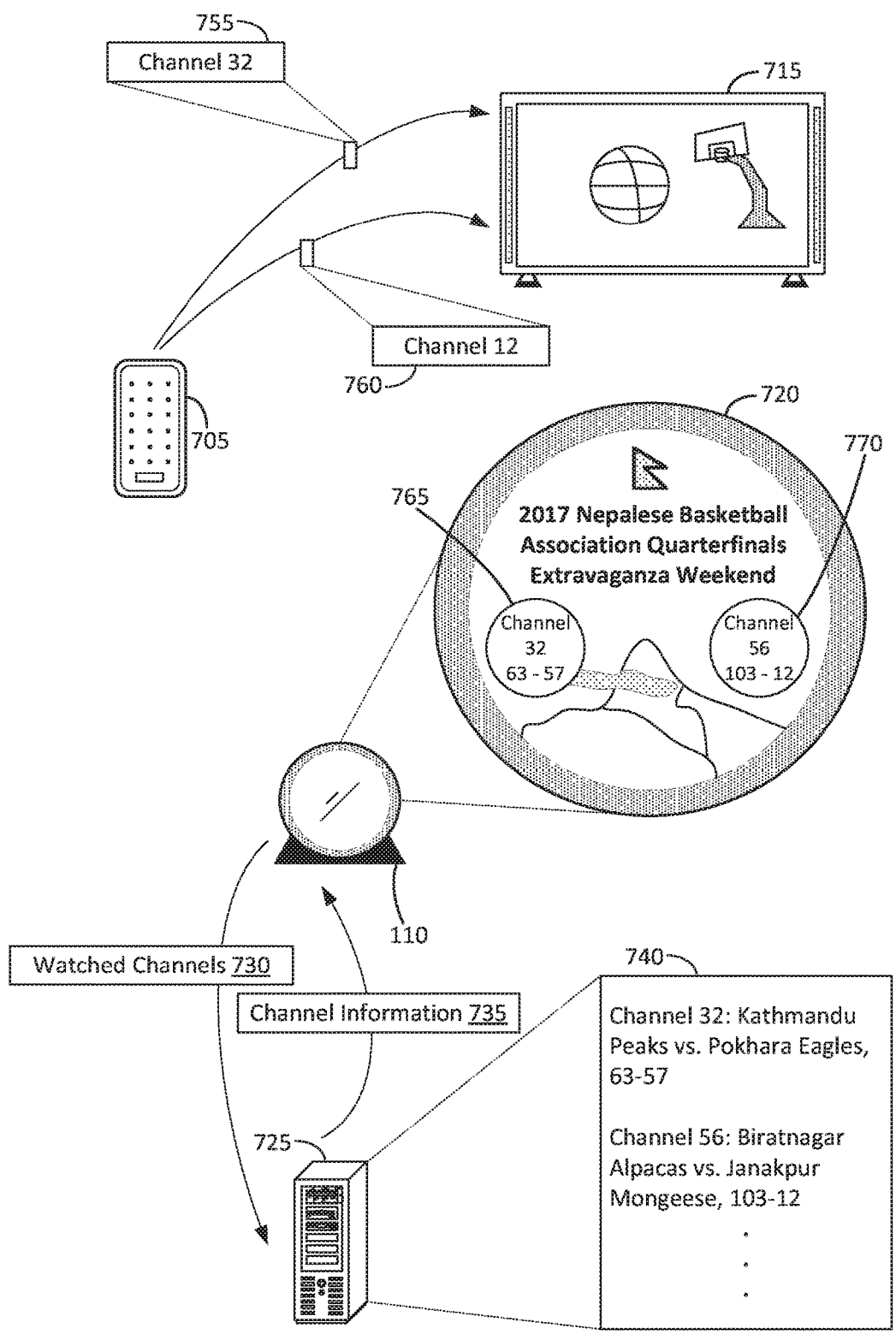
FIG. 7 illustrates an example of providing a user interface based on the playback of media content.

FIG. 7 illustrates an example of providing a user interface based on the playback of media content. In FIG. 7, a user might select buttons on remote control 705 to change the channel being played back on television 715. For example, the user might first use remote control 705 to turn on television 715, and then select one or more buttons such that IR light 755 indicating that television 715 is to switch to channel 32 is generated by remote control 705. In FIG. 7, channel 32 might be playing a basketball game. During a time out or commercial break, the user might want to switch to another channel to watch another basketball game. Thus, in FIG. 7, the user can use remote control 705 to generate IR light 760 indicating that television 760 should switch to channel 12, which is a different channel providing playback of another basketball game (i.e., playback of different media content). The different channels can be different sources of media content, for example, different sources of live playback provided by different television stations.

In FIG. 7, home assistant device 110 can include a photodiode or other type of circuitry to determine that IR light 755 and 760 were generated by remote control 705. By keeping track of the IR signals corresponding to IR light 755 and 760 (e.g., by storing data in a database indicating the channels being switched to), home assistant device 110 can determine which channels that the user is watching (e.g., channels 12 and 32 in FIG. 7). For example, if the user is switching between the two channels several times within a time duration (e.g., switching channel 12-to-32 and channel 32-to-12 are performed among a threshold number of times within a threshold time duration, such as at least four times within twenty minutes), then home assistant device 110 can determine that the user is interested in the media content being played back on both of those channels. Home assistant device 110 can provide watched channels information 730 indicating that the user is watching channels 12 and 32, as well as other information such as the type of cable provider to server 725.

Server 725 can be a cloud server that tracks information regarding the media content being played back on channels. For example, server 725 can receive or generate real-time information regarding the media content being played back on different channels. If channels 12 and 32 are playing back different basketball games (or other types of sports), then server 725 can store information indicating the teams playing, the time left in the game or portion of the game (e.g., how much time is left in a period or quarter), the score, team logos, team records (e.g., wins, losses, ties), etc. Other types of media content can include different types of information. For example, if a movie is being played back on another channel, then ratings, reviews, box office revenue, time left to finish playback of the movie, actors and actresses starring in the movie, director and/or other filmmaker credits, etc. can be stored by server 725. In FIG. 7, channel information database 740 of server 725 can store the information regarding the media content being played back on different channels.

If server 725 receives watched channels information 730, then it can provide channel information 735 using information from channel information database 740. For example, if channels 12 and 32 are playing back different basketball games, then the information indicated above (e.g., scores, etc.) can be provided to home assistant device 110. Home assistant device 110 can then generate content on user interface 720 displayed upon its display screen using that information. Thus, characteristics of a live broadcast (e.g., the score of a live basketball game) can be provided to home assistant device 110 to be depicted upon its display screen.

For example, in FIG. 7, television 715 might currently play back media content provided on channel 12. Home assistant device 110 can determine this (e.g., by keeping track of IR light 755, 760 as discussed previously) and then generate and display hot button 765 using channel information 735 regarding channel 32. That is, one of the channels that the user was determined to be switching among (e.g., channel 32) can be currently not playing back on television 715 and information regarding that channel can be displayed using user interface 720. For example, in FIG. 7, hot button 765 includes a channel number and a score of a basketball game being played back on that channel. However, any other information from channel information 735 and obtained from channel information database 740 can be generated (e.g., team names, graphical logos, etc.) as well. Thus, hot button 765 indicates that the user was previously watching channel 32. Channel information 735 can be provided periodically (e.g., every 1 second, every 1 minute, etc.) and the information displayed upon hot button 765 can be updated to reflect changes or activities going on in the media content being played back on that channel while the user is watching another channel. For example, the score of the basketball game being played back on channel 32 can be updated as it changes. If the user is currently watching channel 12 and the information displayed on hot button 765 seems like that other basketball game is getting more exciting, then the use can quickly and easily switch from channel 12 to channel 32 by selecting hot button 765. Home assistant device 110 can then generate an IR signal using IR light pulses similar to remote control 705 to cause television 715 to change to channel 32. This can result in channel 32 then being displayed on television 715, and a new hot button providing information regarding the basketball game on channel 12 being generated and displayed on user interface 720. In other implementations, home assistant device 110 might provide the signal to remote control 705 and instruct it to cause television 715 to change channels accordingly. In another implementations, home assistant device 110 and television 715 might be communicatively coupled with each other via a wireless network and communicate with that rather than via IR light.

The user might also not be aware of other channels providing playback of media content that they might be interested in. For example, the user might be watching the basketball games being played back on channels 12 and 32. However, those basketball games might be part of a larger basketball tournament and other games related to that tournament might be playing back on other channels. Server 725 can determine this (e.g., by determining similarities in the media content being played back on the different channels) and include information regarding those other channels in channel information 735. For example, as depicted in FIG. 7, channel 56 as indicated in channel information database 740 is playing back another basketball game. Thus, server 725 can include this information in channel information 735 and provide it to home assistant device 110. Home assistant device 110 can then generate hot button 770 indicating that channel 56 has another game available for watching on television 715. Thus, even though the user was switching among channels 12 and 32, the user can be recommended to expand the selection of channels they are watching to include channel 56 because it is playing another basketball game. Additionally, information regarding that game (e.g., the score) can be displayed upon hot button 770. This can provide the user with some information regarding what is being played back on that other channel and, therefore, they can decide whether to switch to it.

Figure 8:
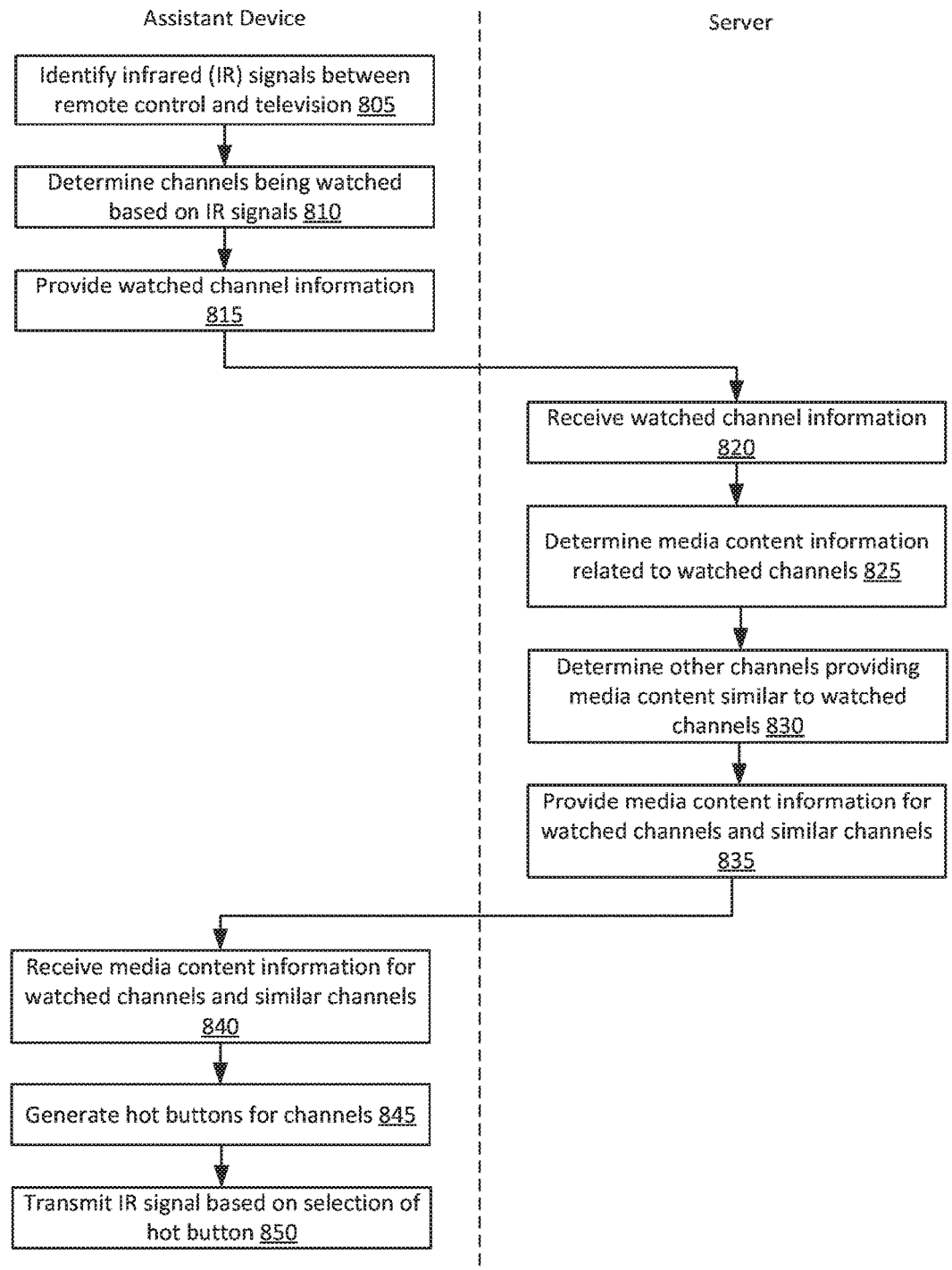
FIG. 8 illustrates an example of a block diagram for providing a user interface based on the playback of media content.

FIG. 8 illustrates an example of a block diagram for providing a user interface based on the playback of media content. In FIG. 8, IR signals transmitted by a remote control to a television can be identified (805). For example, as discussed regarding FIG. 7, IR light 755 and 760 can be received by home assistant device 110 such that it can determine which channels are being watched using television 715.

The channels being watched can be determined based on the IR signals (810). For example, in FIG. 7, home assistant device 110 can determine the type of television of television 715 (e.g., brand, model number, etc.). Different IR signals can be used by different remote controls and televisions. Thus, the channels being watched can be identified. Additionally, channels can be indicated as being watched based on characteristics of the user's television watching habits. For example, some users might be "channel surfing" in which they are constantly switching through channels (e.g., ascending upwards through the channels from 1 to 2, 2 to 3, etc.). However, eventually, the user might select only a handful of channels to switch among. Those channels can be identified as channels being watched.

In some implementations, the channels can be identified based on how often the user is switching among the channels within a time duration (e.g., a particular channel is watched or switched to a threshold number of times within a threshold time duration, such as four times in twenty minutes). If the user is switching among five channels within the time duration, then those five channels can be identified as channels being watched. In other implementations, if the IR signals are for specific channels (e.g., indicating to television 715 in FIG. 7 to switch to channel 12 rather than merely switching through a channel list such as from channel 11 to channel 12 to channel 13, etc.) then those specific channels can be the identified channels.

In another implementation, the user's speech can be detected, for example, using microphones of home assistant device 110. If the user is determined to be talking regarding the media content (e.g., the subject that is the target of the media content) of the channel, then the channel can be one of the identified channels. This might be done because if the user is discussing the media content being played back, then they might be interested in watching that channel. In another example, the user's activity can be detected using video cameras to generate image frames of the environment depicting what the user is doing while watching the channels. If the user is perceived (via image recognition algorithms) to be staring at the television for a time period (e.g., for at least thirty seconds), then the channel being played can be an identified channel. If the user is not staring at the television for at least that time period, then that channel might not be of interest to the user. Other visual characteristics of the user can also be identified. For example, if the user or others in the environment are wearing attire or holding paraphernalia such as a cap, jersey, flag, etc. indicating a sports team, then that can be recognized (including the sports team in some implementations) and be used to identify channels playing games related to that sport.

In another implementation, characteristics of the channel or the media content played back on that channel can be used. For example, channels can be marked as favorites by a user, indicating that they are channels that the user prefers to watch and, therefore, should be identified as being watched. The type of content being played back can also be determined. For example, news, sports, or other programming or media content that are generally played back in real-time (i.e., currently ongoing) can be identified as a watched channel if the user selects it.

The watched channel information can then be provided to a server (815). For example, in FIG. 7, watched channel information 730 can be provided to server 725. The server can receive the watched channel information (820) and then determine media content information related to the watched channels indicated in the watched channel information (825).

For example, in FIG. 7, the channels being watched by the user can be detailed via watched channel information 730. The channels being watched can be looked up in channel information database 740 by server 725 to determine information regarding the media content being played back on the channel, for example, a score of a sports game if the media content is a sports game.

Additionally, other channels providing media content similar to the media content of the watched channels (i.e., identified channels) can be determined (830). For example, server 725 can determine the type of media content being played back (e.g., news, sports, a movie, a comedy television show, stand-up comedy routine, etc.), people acting in the media content, the director or filmmaker of the media content, or other characteristics of the media content itself to identify similar media content currently being played back on other channels (e.g., as indicated in channel information database 740). As previously discussed, these other channels might be of interest for the user to watch. The media content information for the watched channels and the similar channels can then be provided (835) to the home assistant device (840).

The home assistant device can then generate hot buttons for the channels on the user interface displayed upon the display screen of the home assistant device (845). For example, home assistant device 110 in FIG. 7 can determine which channel is currently playing on television 715 (e.g., by keeping track of the IR signals and determining that the last channel switched to based on the IR signals is the currently played back channel) and then generate hot buttons for the other channels that are not being played back. For example, in FIG. 7, hot button 765 can be generated for a channel that the user was previously watching and hot button 770 can be generated for a channel that the user was not watching but might be interested in watching (as determined by server 725, as previously discussed) because the media content being played back there is similar to the media content currently on the channel being played back on television 715.

If the user selects one of the hot buttons, then this can be determined (e.g., by detecting touches on the touchscreen that are at coordinates corresponding to the position of the hot button) and the home assistant device can generate or transmit an IR signal for the television to switch the channel based on the selected hot button. For example, in FIG. 7, if the user selects hot button 770, then home assistant device 110 can generate an IR signal to be received by television 715 instructing it to switch to channel 56. Thus, the user can use home assistant device 110 to easily and quickly switch the channels played back on television 715.

In some implementations, server 725 in FIG. 7 can also provide graphical content to be displayed with UI 720. For example, if server 725 determines similarities between the channels, then it can provide a graphic to home assistant device 110 to display with the hot buttons 765 and 770. For example, if the user is switching between several different basketball games provided via different channels, each of those basketball games might be games of a larger basketball tournament. To help contribute to the atmosphere of watching the tournament, server 725 can provide text or graphical content as a theme to be displayed upon the display screen of home assistant device 110 to advertise that tournament. For example, in FIG. 7, the background graphic depicts the name and other related graphics identifying the tournament in which the different channels are providing playback of its games.

Figure 9:
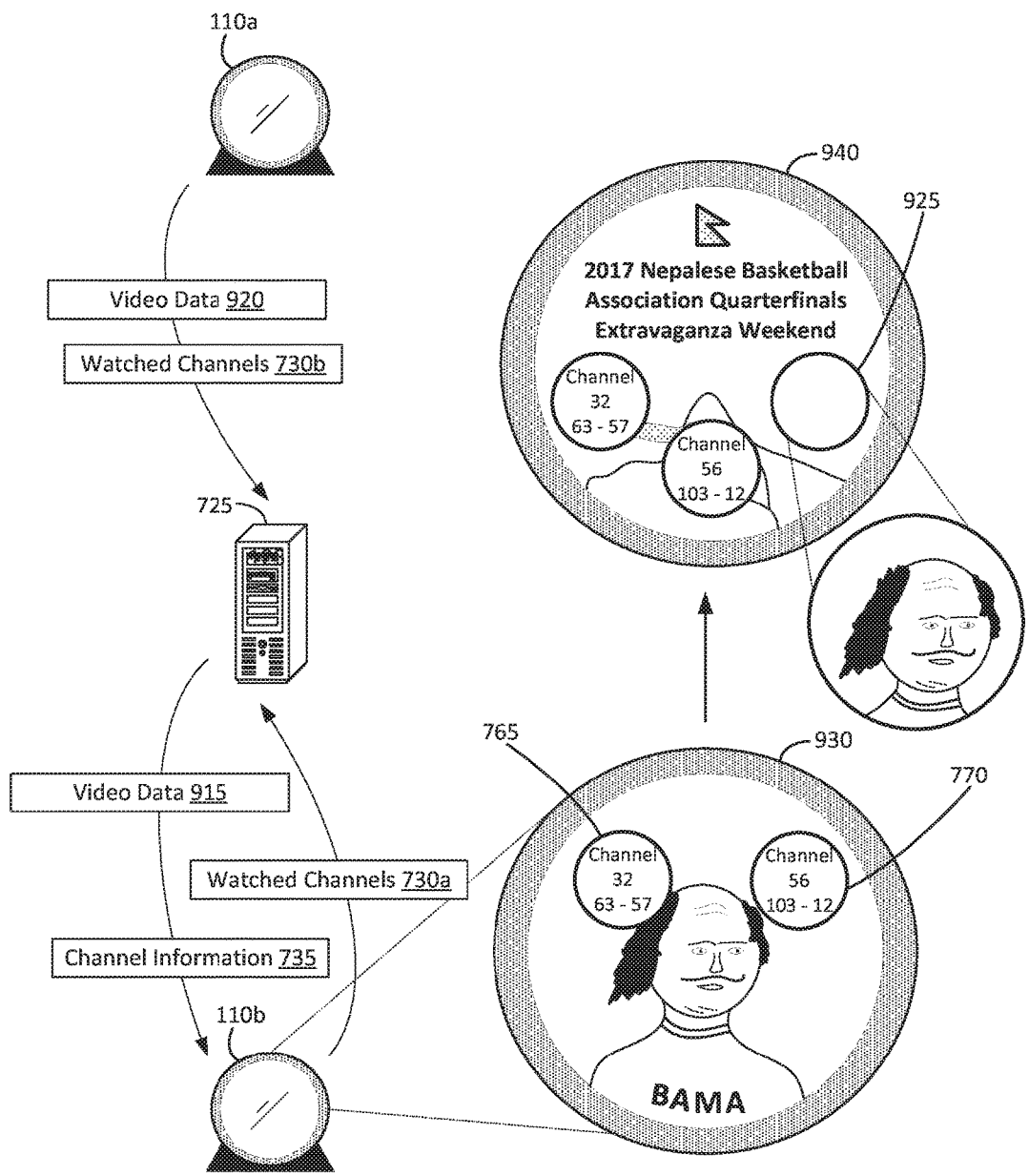
FIG. 9 illustrates an example of providing a user interface based on shared activities.

Home assistant devices can also be used to provide a more social experience for users within their homes. FIG. 9 illustrates an example of providing a user interface based on shared activities. In FIG. 9, home assistant device 110a and home assistant device 110b can be in different physical spaces, for example, the living rooms of different homes of different users. Watched channels information 730a indicating the channels being watched by a user in a home with home assistant device 110a and watched channels information 730b indicating the channels being watched by another user in another home with home assistant device 110b can be provided to server 725. Server 725 can then determine similarities between the channels indicated by watched channels information 730a and 730b to determine that the two users are engaged in a similar activity within their respective environment, in this example the similar activity being watching similar or same television channels within their homes. For example, if home assistant device 110a determines that a user is switching among channels 32, 56, and 12, and that home assistant device 110b determines that a user is switching among channels 32, 56, and 15, then server 725 can determine that two of the three channels being watched by the users are the same, with each user also watching a different channel not being watched by the other user. In some implementations, if there is some overlap between the channels being watched (e.g., at least 50% of the channels are being watched by both users, at least 1 channel is being watched by both users, etc.) then when channel information 735 is provided to home assistant device 110*a*, information regarding some of the channels being watched by the user having home assistant device 110*b* can be provided to home assistant device 110*b* as a recommendation for the user to expand his or her channels to watch. For example, home assistant device 110*a* can generate a hot button on user interface 930 with information regarding channel 15 (i.e., the channel being watched by the other user that was not being watched by the user of home assistant device 110*a*).

Additionally, the users can be allowed to engage in a video chat based on a determination that they are engaged in similar activities. This can allow for a home assistant device to create a more social experience. For example, in FIG. 9, if watched channels information 730*a* and 730*b* are determined to include some similarities of the channels being watched by the users, then server 725 can request for the home assistant devices to provide video and/or audio data to enable a video chat. For example, server 725 can indicate to home assistant device 110*b* that it should activate a camera, begin recording image frames, and record audio using its microphone and provide that information as video data 920 which can be received by server 725. Server 725 can then provide video data 915 to home assistant device 110*a* such that it can display video content (e.g., image frames) of a video chat on user interface 930. As depicted in FIG. 9, the video content is displayed in the background of user interface 930 with hot buttons 765 and 770 overlaid upon the background. Thus, the information and functionality provided by the hot buttons as described herein are still provided, but user interface 930 further provides a video chat with the user of home assistant device 110*b*. In some implementations, the video chat can be played back in a new hot button 925 that can be generated as depicted in user interface 940. The user can then select hot button 925 to play back the video chat on the full display screen (e.g., fill up the entire display screen, or fill in the background as depicted with user interface 930). For example, home assistant device 110*b* can generate IR signals instructing the display device to select a new device input (e.g., change its HDMI, DVI, etc. input) to one that is communicatively coupled with the home assistant device 110*b* so that it can display the video chat on the display device. In another example, home assistant device 110*b* can be using the same wireless network within the home as the display device and, therefore, can stream the video chat using the wireless network.

Figure 10:
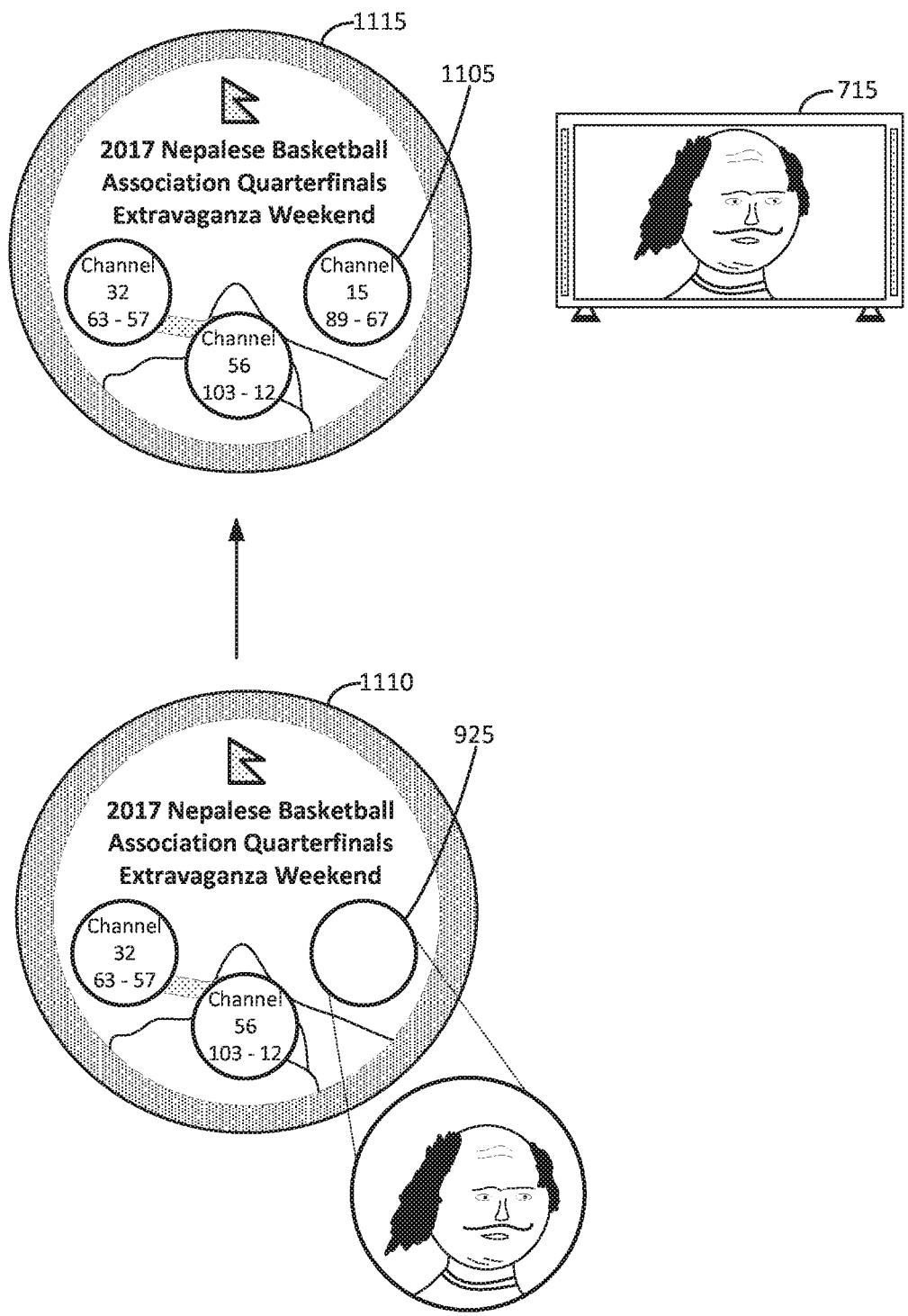
FIG. 10 illustrates an example of playback of a video chat based on shared activities.

In some implementations, the user can select hot button 925 and cause the video chat to be played back on a television. FIG. 10 illustrates an example of playback of a video chat based on shared activities. In FIG. 10, if a user selects hot button 925 of user interface 1110, user interface 1115 can be generated including hot button 1105 replacing hot button 925 (i.e., hot button 925 is removed and hot button 1105 is generated to replace it). Hot button 1105 can include information regarding the channel that was being watched on television 715 before hot button 925 was selected. Upon selecting hot button 925, the video chat can be played back on television 715. This can allow for the user to dedicate more attention on the video chat (e.g., by displaying it on television 715 which can have a larger display screen that home assistant device 110*a*) but still be provided with information regarding the previous channel that was being watched by generating hot button 1105 in user interface 1115. Thus, the user can quickly adjust the playback of media content within the home, including what is being played back on the display screen of home assistant device 110*a* and television 715.

Figure 11A:
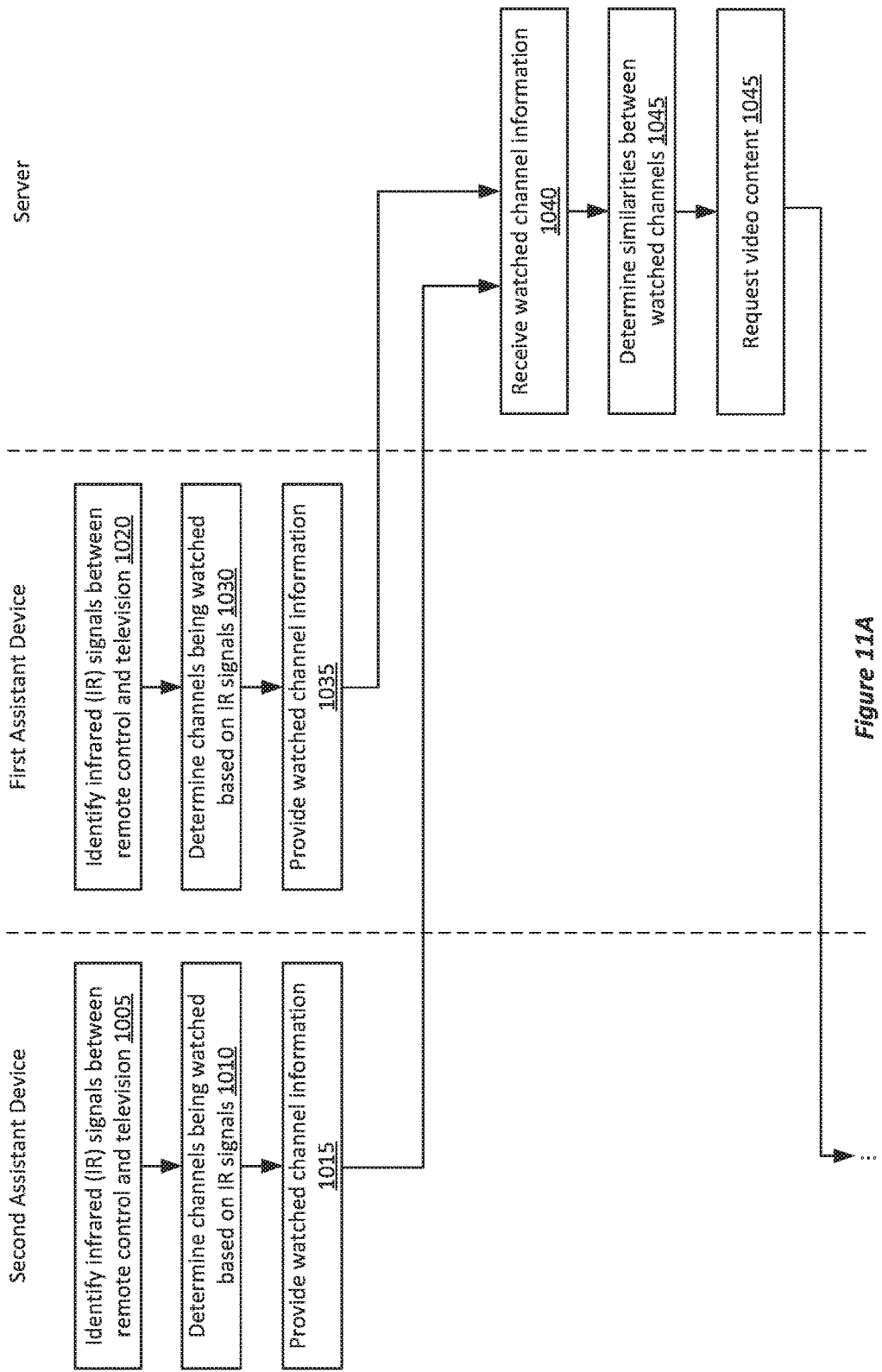
FIGS. 11A and 11B illustrate an example of a block diagram for providing a user interface based on shared activities.
Figure 11B:
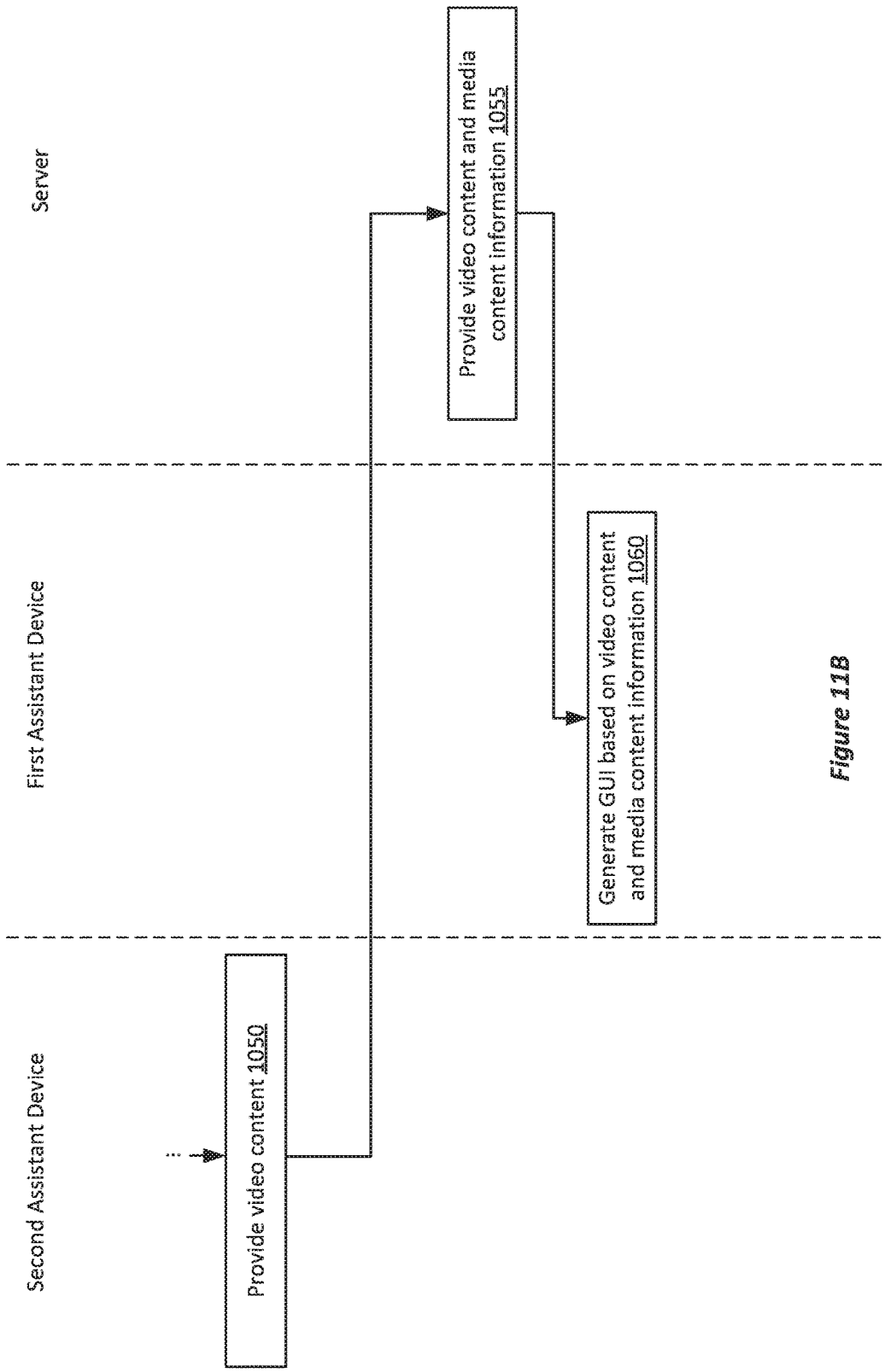

FIGS. 11A and 11B illustrate an example of a block diagram for providing a user interface based on shared activities. In FIG. 11A, IR signals between a remote control and a television can be detected for a first assistant device (1020) and a second assistant device (1005), similar as discussed previously. This results in a determination as to the channels being watched for the first assistant device (1030) and the second assistant device (1010), and those devices can then provide their corresponding watched channel information to a server (1015, 1035).

The server can receive the watched channel information (1040) and determine similarities between the watched channel information received from the first assistant device and the watched channel information received from the second assistant device (1040). For example, the users might be watching one channel each, and the channel being watched can be identified as being the same for both. In some implementations, the users might be switching among a different combination of channels, with some overlap between what the different users are watching. Thus, some similarities (e.g., the channels being switched among include two of the same channels) can be identified.

Upon determination of the similarities, this can indicate that the users are engaged in a similar activity, for example, watching similar television channels. Thus, the server can request video content from the devices (1045). For example, as depicted in FIG. 9, server 725 can request and receive video data 920 from home assistant device 110*b* and provide corresponding video data 915 (including similar or same content as video data 920) to home assistant device 110*a* to provide a video chat using home assistant device 110*a*.

Thus, in FIG. 11B, video content from the second assistant device can be provided to the server (1050) and that video content can then be provided to the first assistant device along with media content information regarding the channels (1055). As previously discussed, the media content information can include information regarding the media content being played back on the channels (e.g., the score of a sports game). Additionally, the media content information can also include information regarding the channels being watched by the other user that are not being watched by the user of the first assistant device. The first assistant device can then generate a user interface based on the video content and the media content information (1060). For example, in FIG. 9, user interface 930 can display video content for a video chat (with audio provided by a speaker, and a microphone and camera to provide for similar content for the other user) along with hot buttons 765 and 770.

In some implementations, a hot button to provide the video chat on television 715 can be selected and the new hot button for the previously watched channel can be generated, as previously discussed. A user might select the hot button for the video chat to be displayed on television 715 due to a commercial break during a sports game to discuss with the other participant in the video chat. However, when the sports game resumes from the commercial break, the user might want to have that be displayed again on television 715 and have a hot button for the video chat to be generated back onto the user interface. In some implementations, this can be performed by home assistant device 110*b*. For example, if the user selects hot button 925 in FIG. 10 to have the video chat displayed on television 715, then hot button 1105 in user interface 1115 can be generated to replace hot button 925 and include the score of the sports game that was being watched that went into a commercial break. Home assistant device 110b can receive channel information 735 from server 725 periodically (as previously discussed). Thus, eventually, channel information 735 might indicate that the sports game has returned from a commercial break, or it might provide a new score because the sports game has returned from a commercial break and a team has recently scored. Home assistant device 110b can determine this (e.g., determine that the score has changed since hot button 1105 was generated following the selectin of hot button 925 in FIG. 10) and then cause the sports game (e.g., channel 15 in hot button 1105 in FIG. 10) to be played back on television 715 and then generate hot button 925 again for the video chat.

In some implementations, home assistant device 110b might indicate to the user that the game has resumed. For example, it can play a sound (e.g., beep) using its speakers, cause hot button 1105 to glow, flicker, or other type of visual indication, etc.

In some implementations, if users are often switching the video chat to television 715 (e.g., three times in the last five minutes, etc.) then this might indicate that the users are actively engaged in the shared activities in a social way. Thus, in some implementations, if the user of home assistant device 110b selects a hot button to change a channel, then this information can be provided to server 725 and on to home assistant device 110a, which can cause the television being used there to change channel. Therefore, the users can be able to change the channel being watched by the other user such that their watching is synchronized.

In some implementations, the information regarding the media content being played back on a channel can be monitored by a home assistant device. Based on the content of the information, the user interface can be changed. For example, if channel information 735 indicates that a score of the sports game being played on hot button 765 in FIG. 9 is close (e.g., the score represents that one team only has a 3 point lead), then hot button 765 might be emphasized, for example, by making it larger in size than the other hot buttons. This can allow for the user to quickly and easily be alerted to interesting events going on in the media content being played back on the channels. In another example, the placement of the hot buttons can be based on the information regarding the media content. For example, hot button 765 might be placed at the top of the display screen where it is more easily perceivable by the user. Thus, the layout of the hot buttons on the user interface can be adjusted as new channel information 735 is received.

Though the prior example describes watching similar television channels as similar or shared activities identified using different home assistant devices within different homes, other activities can be identified. For example, just watching television (regardless of the channels) can be identified as a similar activity. In another example, if both users are identified as cooking, then that can be identified as a similar activity and the users can be engaged with a video chat while they are cooking.

Any of the techniques described elsewhere herein can also be used for the content (e.g., hot buttons, etc.). For example, different users might result in different sizes of hot buttons, positions of hot buttons, number of hot buttons, etc. In another example, hot buttons for channels that the user was identified as watching can be a different size (e.g., larger) than other channels recommended by server 725.

Additionally, the techniques describe switching among different channels of a television. However, switching among different streaming media content can also be performed using similar techniques.

Figure 12:
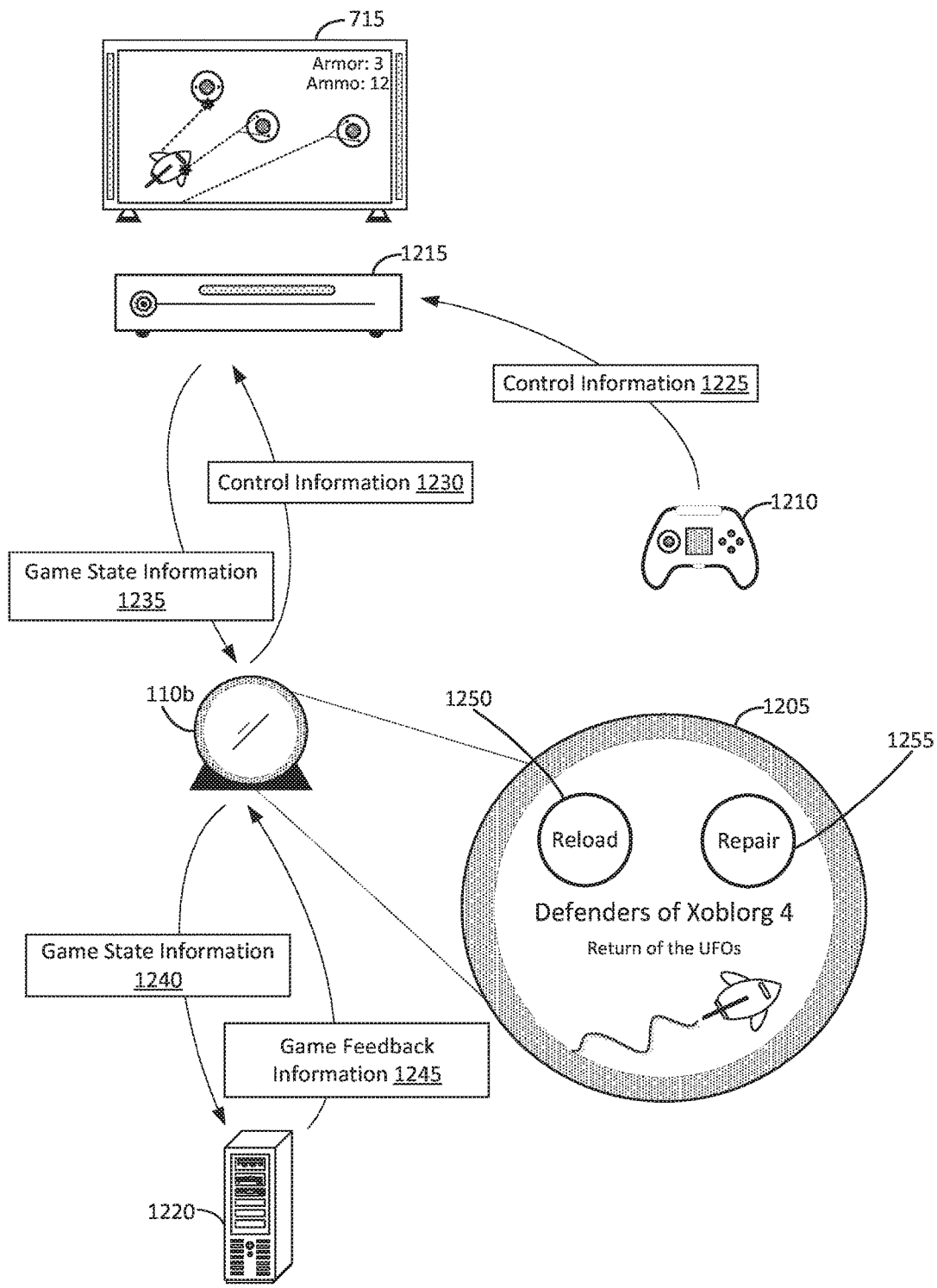
FIG. 12 illustrates an example of providing a user interface based on playback of video games.

Activities involving video games can also be identified. FIG. 12 illustrates an example of providing a user interface based on playback of video games. In FIG. 12, a user can manipulate video game controller 1210 to generate control information 1225 provided to video game console 1215. This can be provided via a wired or wireless communication connection. Video game console 1215 can modify or control the playback of a video game being played back on television 715 based on control information 1225. For example, the user can use video game controller 1210 by moving a joystick, pressing buttons, etc. In response, video game console 1215 can receive control information 1225 indicating those uses of video game controller 1210 and, for example, move a player character (controlled by the user) within a virtual world of the video game played back on video game console 1215. In the example, this results in a depiction of the player character moving, or the field of view of the player character changing, on television 715.

Some actions that the user might want to perform within the video game might use the manipulation of several buttons of video game controller 1210. In a hectic gaming environment (e.g., an action-oriented video game), it might be difficult to quickly select several buttons in the moment.

In FIG. 12, home assistant device 110b can be placed within the environment of video game console 1215, for example, close to the user on a coffee table, end table, etc. around a sofa of a living room. As such, home assistant device 110b can provide assistance regarding the playback of the video game for the user.

For example, home assistant device 110b can be communicatively coupled with video game console 1215 (e.g., wirelessly over the wireless network of the environment as provided by a router). As a result, home assistant device 110b can receive game state information 1235. Game state information 1235 can provide information regarding a state of the playback of the video game on video game console 1215. This can include information regarding characteristics of the player character (e.g., health, inventory, location, etc.), the progress towards completion of the video game, how long the user has been playing the video game in the current playback session (e.g., 1 hour, 30 minutes since the video game was executed for playback), a level or stage in a progression of levels or stages currently being played, saved game information (e.g., saved game states allowing the user to continue playback of the video game from a particular point towards completion), future playback possibilities (e.g., what will happen or will likely happen in the near future), etc.

Using game state information 1235, home assistant device 110b can generate GUI 1205 on its touchscreen. GUI 1205 can be generated to include hot button 1250 and hot button 1255. Each of the hot buttons can provide different functionalities to be performed or implemented within the playback of the video game. For example, if game state information 1235 indicates that the player character has low health (e.g., the health level of the player character controlled by the user is within a threshold range indicating that the current iteration of the playback of the video game might end or terminate due to the "death" of the player character), then hot button 1255 can be generated. When hot button 1255 is selected by the user, this can cause home assistant device 110b to generate control information 1230 and provided to video game console 1215. In some implementations, control information 1230 can include the same type of data as would be provided by video game controller 1210 if the similar controls were selected with that. Video game console 1215 can then perform the action as indicated by hot button 1255. In this example, the player character's health level can be increased by using an item in the player character's inventory. This can result in the lifetime of the player character to be extended such that the current iteration of playback can be extended.

In the example of FIG. 12, hot button 1250 is also generated based on game state information 1235. In FIG. 12, hot button 1250, when selected, allows for control information 1230 to indicate to video game console 1215 that the inventory level of an item used by the user's player character (e.g., ammo for a weapon) should be reloaded. Thus, by selecting hot button 1250, control information 1230 can instruct video game console 1215 to replenish the inventory level of an item such that it can be used for a longer time, or that the item should become functional (until it runs out of ammo).

In some implementations, the user can select hot button 1255 via voice recognition. For example, home assistant device 110*b* can generate an audio response via its speakers to provide voice or speech informing the user that hot button 1255 is available. Rather than physically selecting the button with a finger that would otherwise be used to hold video game controller 1210, the user can request for home assistant device 110*b* to have the action be performed by video game console 1215. For example, the user can say "Increase my health!" which can be picked up by the microphone of home assistant device 110*b* and corresponding control information 1230 can be provided to video game console 1215.

Home assistant device 110*b* can include a camera, or have access to a camera within the environment, and determine visual characteristics of the user playing the video game. For example, image frames captured from a camera can be analyzed to determine whether someone in the environment is holding video game controller 1210 while a video game is being played back on video game console 1215 (e.g., game state information 1235 is provided to home assistant device 110*b*). Thus, home assistant device 110*b* can recognize the user controlling the player character among a crowd of people including others who might be watching the playback of the video game but not actually playing.

Visual characteristics of the user controlling the player character can then be determined and used to provide information to the user. For example, if the user is determined to be quickly controlling video game controller 1210 (e.g., by selecting buttons, moving the joystick in different directions, etc. at a relatively fast rate), then this might indicate that the user is engaged in an intense situation within the video game (with the player character). Thus, the user might not have time to physically select a hot button on GUI 1205, or might not want to take attention away from television 715. Thus, in these situations, home assistant device 110*b* can provide the audio response as discussed above. As a result, home assistant device 110*b* can analyze image frames depicting the user playing the video game, determine how the user is manipulating the video game controller used to play the game, and then provide interaction opportunities to the user based on how the user is manipulating the video game controller.

Audio characteristics can also be determined and used in a similar manner. For example, what the user is saying within the environment while playing the video game can be determined. For example, if the user is frustrated, this can be determined by home assistant device 110*b* analyzing the user's speech content (e.g., by picking up the speech with its microphone). If certain keywords are present in the user's speech content (e.g., curse words, remarks regarding how difficult the video game is, concerns regarding characteristics of the player character such as the health, etc.) then this can be indicative of the user having a frustrating experience with the playback of the video game. Home assistant device 110*b* can recognize these and provide interaction opportunities (such as a hot button) to the user based on what the user is saying while playing the video game.

In some implementations, home assistant device 110*b* can determine how the user is manipulating video game controller 1210 to determine what types of actions the user is performing within the video game. For example, sequences of buttons, joystick movements, touch swipes, etc. performed using the mechanisms of video game controller 1210 can be determined by home assistant device 110*b* using a camera generating image frames of the user manipulating video game controller 1210. In another example, home assistant device 110*b* can also receive control information 1225 (in addition to being provided to video game console 1215) or game state information 1235 can include similar information. Based on the actions being performed within the video game, home assistant device 110*b* can generate different hot buttons upon GUI 1205 or provide different audio prompts regarding actions that can be performed within the video game.

For example, if the user is determined to be frequently selecting a similar or same sequence of joystick movements, button selections, etc. on video game controller 1210 then this can be determined by home assistant device 110*b*. Home assistant device 110*b* can determine that these sequences correspond to particular actions to be performed within the video game. Thus, home assistant device 110*b* can generate hot buttons on GUI 1205 allowing for a single selection of a hot button to replace a potentially long sequence of manipulations of video game controller 1210. In some implementations, sequences within some threshold range (e.g., a sequence representing five or more manipulations such as button selections on video game controller 1210) can be determined and used to generate a hot button on GUI 1205. This might be useful because a user might find it more helpful (e.g., take less time) to take a hand off video game controller 1210 to physically select a hot button if it replaces a relatively long sequence of selections. In some implementations, home assistant device 110*b* can also provide an audio prompt regarding the hot button based on the determination regarding the sequence.

In some implementations, the size of the hot button can be based on the length of the sequence. For example, if a hot button represents a sequence of five button selections on video game controller 1210, then the size of that hot button might be smaller than a hot button representing a sequence of ten button selections on video game controller 1210.

Game state information 1235 provided to home assistant device 110*b* can also include information regarding the future playback of the video game. Using that information, home assistant device 110*b* can provide interactions such as generating a hot button or providing an audio response regarding an action that can be performed in the video game. For example, if game state information 1235 indicates what might occur in the relatively near future during the playback of the video game (e.g., five new enemies will appear during the playback, the player character is about to enter a non-combat zone, the player character is about to approach a "boss" or highly-challenging portions of the playback, etc.), then home assistant device 110*b* can prepare the user for the upcoming events to occur during the playback by generating a hot button. Thus, the hot buttons can also serve as recommendations for actions for the user to perform in preparation of future playback. As previously discussed, speech output can also be used to provide these recommendations.

In one example, if the user's player character is about to enter a challenging portion of the playback, then home assistant device 110b can determine this by receiving game state information 1235. If the player character has a health level below some threshold level and the challenging portion is approaching (i.e., the playback is going to change resulting in a more difficult playback, for example, a playback having characteristics such as more enemies, enemies with more health, etc.), then home assistant device 110b can generate a hot button such as hot button 1255 to indicate to the user that restoring the health level might be useful in the current iteration of the playback. Thus, the user's enjoyment of the playback of the video game can be improved. Home assistant device 110b can also provide an audio prompt regarding recommended actions.

Any of the details regarding generation of hot buttons can be applied in a similar manner to the hot buttons generated upon GUI 1205 to enhance the video game playback experience. For example, in FIG. 12, hot button 1250 might be emphasized over hot button 1255, for example, by being bigger, placed in a particular location, being animated, etc. For example, home assistant device 110b can emphasize a hot button that replaces a longer sequence of manipulations of video game controller 1210 than a hot button that has a shorter sequence. This can allow for the user to more easily select a hot button.

In some implementations, home assistant device 110b can also use cameras and microphones to analyze the playback of the video game on television 715. For example, to supplement game state information 1235, home assistant device 110b can also obtain image frames depicting the playback of the video game on television 715, or also audio data indicating the sounds provided by the speakers of television 715 as the result of the playback of the video game. This can also be used to determine the state of the playback of the video game.

Returning to FIG. 12, GUI 1205 can also include graphical, textual, audio, or other types of content related to the video game being played. This can allow for home assistant device 1205 to be more tailored to the playback experience of the video game. In FIG. 12, a background image depicting the title of the video game and a graphical logo can be generated upon GUI 1205 with hot buttons 1250 and 1255. This information can be received from server 1220. For example, home assistant device 110b can provide game state information 1240 (e.g., the same, more, or less data than as provided by game state information 1235) including the title of the video game being played back by video game console 1215 on television 715. Server 1220 can receive this information and determine content related to the title of the video game, and in turn provide back game feedback information 1245. Game feedback information 1245 can provide the graphical, textual, or audio content to be displayed on GUI 1205 during playback of the video game.

Home assistant device 110b can also provide additional feedback to the user. For example, home assistant device 110b or game state information 1235 can indicate that the user's player character has died repeatedly at a certain point of the playback, resulting in multiple iterations of the playback (e.g., five times in five minutes). Home assistant device 110b can then generate control information 1230 to include an instruction indicating that a difficulty level of the playback of the video game should be reduced to make the playback easier. When the user finally passes that point of the playback without having to restart a new iteration of the playback, then home assistant device 110b can determine this (e.g., using any of the techniques disclosed such as indicated by game state information 1235, audio/visual data, etc.) and then generate new control information instructing video game console 1215 to increase the difficulty level back to what it was before. Thus, the playback of the video game can be temporarily adjusted if the user is having difficulty, and then adjusted back to what it was before. This can allow for some users to have a better playback experience.

How other users are playing back the video game in their own homes can also be used to generate interactions such as providing hot buttons. For example, server 1220 can receive game state information 1240 from many different home assistant devices and it can determine the actions being performed within the video game by different users. Thus, game feedback information 1245 can provide this information to home assistant device 110b and this can be used to generate hot buttons or provide audio responses to aid the user in progressing through the playback of the video game.

For example, home assistant device 110b can provide game state information 1240 to server 1220 and receive back game feedback information 1245. For instance, game state information 1240 can indicate characteristics regarding the player character and the progress through the playback. This can be used by server 1220 to provide helpful hints to the user by providing game feedback information 1245.

For example, server 1220 can determine the point during the playback that the user is currently at, or about to be at. Server 1220 can then determine (e.g., by looking up in a database) the actions performed in the video game by other users at that point during the playback. For example, if the user is approaching a point where many others save the game, this can be determined by server 1220 and an indication regarding that can be provided via game feedback information 1245. Home assistant device 110b can then generate a hot button recommending the user to save the game (and also may include a speech prompt regarding this), or home assistant device 110b can generate control information 1230 to instruct video game console 1215 to save the game without any prompting from the user.

In some implementations, if the user is performing some action within the video game that deviates from what most other users do, then home assistant device 110b can also inform the user of this. For example, the user can control a player character such that the player character moves down one path of a labyrinth rather than another path of the labyrinth. This can be indicated in game state information 1240 provided to server 1220. Server 1220 can determine that more users take the other path rather than the path that the user's player character has taken. This information can be provided back to home assistant device 110b and home assistant device 110b can then generate textual, graphical, or audio content indicating to the user that the playback of the video game is actually deviating from the most common way of playing back the video game. For example, textual content can be displayed upon 1205 regarding this, or home assistant device 110b can provide an audio response in the form of speech or voice informing the user.

In some implementations, home assistant device 110b can provide control information 1230 with instructions for video game console 1215 to cause the actions that would result in the most common way of playing back the video game. For example, if other users commonly save a game at a certain point, then home assistant device 110b can determine this (e.g., by using information provided by server 1220) and then automatically save the game by generating control information 1230 instructing video game console 1215 to perform that action.

In some implementations, when the user plays a video game, the information regarding the game stored by server 1220 can be provided to home assistant device 110b. Thus, the determinations made by server 1220 can also be made by home assistant device 110b. For example, how other users play the video game can be provided via game feedback information 1245 to home assistant device 110b and the functionalities described regarding server 1220 can be provided by home assistant device 110b.

Sometimes a user might want to automate some of the actions to be performed within the video game. In these situations, the user can request home assistant device 110b the conditions to perform certain actions, for example, by establishing rules. For example, the user can verbally instruct home assistant device 110b to save the game every 30 minutes. Thus, home assistant device 110b can provide control information 1230 to video game console 1215 instructing it to save the game. Home assistant device 110b can generate these instructions at thirty-minute intervals. The rules can be generated by the user speaking to home assistant device 110b, or the user can use a software application to establish the rules.

In another example, the user can request home assistant device 110b to perform some action based on the characteristics of the playback of the video game such as characteristics of the player character. For instance, the user can establish a rule to have home assistant device 110b generate control information 1230 to instruct video game console 1215 to perform an action (e.g., use a "health potion") when the player character's health is below some threshold level or within some threshold range. Thus, home assistant device 110b can set the rule, receive game state information 1235, determine that the characteristics correspond to a rule (e.g., various levels, indicators, etc. are sufficient to satisfy the conditions or requirements of the rule), and then generate control information 1230 instructing video game console to perform the action.

In some implementations, how the user plays one video game can be determined and used to adjust the playback of another video game. For example, if the user saves the game often while playing one video game, then when the same user plays another video game, home assistant device 110b can instruct video game console 1215 to save the game at a relatively same frequency. For example, if the user generally saves the state of the game every thirty minutes while playing the first game, then when the user plays the second game, home assistant device 110b can generate control information 1230 approximately ever thirty minutes to save in the second game.

Figure 13:
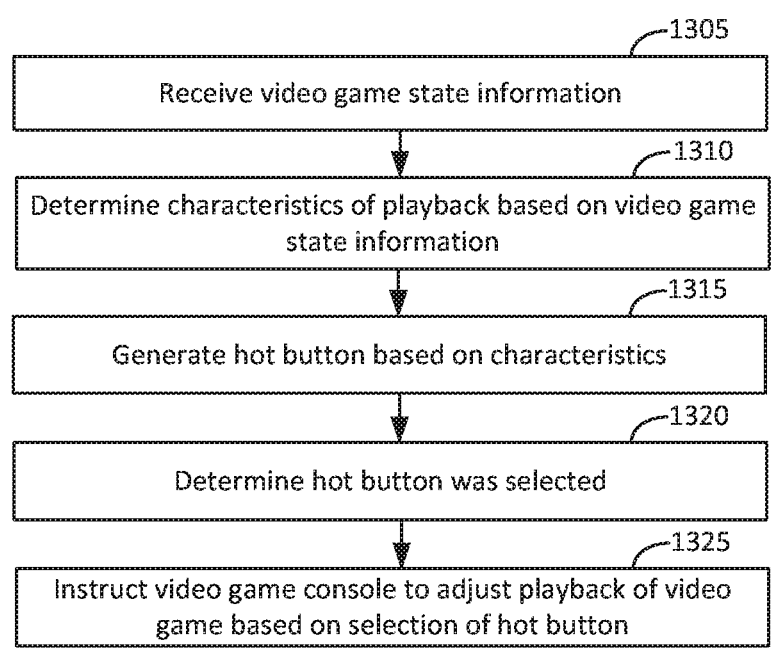
FIG. 13 illustrates an example of a block diagram for providing a user interface based on playback of video games.

FIG. 13 illustrates an example of a block diagram for providing a user interface based on playback of video games. In FIG. 13, video game state information can be received (1305). For example, in FIG. 12, home assistant device 110b can receive game state information 1235. Characteristics of the playback can be determined using the video game state information (1310). For example, in FIG. 12, the information provided via game state information 1235 can be analyzed by home assistant device 110b to determine how the playback of the video game on video game console 1215 is progressing. Based on the characteristics, a hot button can be generated (1315). For example, in FIG. 12, hot buttons 1250 and 1255 can be generated. If one of those hot buttons is selected (1320) then the video game console can be instructed to adjust playback of the video game based on the action corresponding to the hot button (1325). For example, in FIG. 12, if hot button 1255 was selected, then home assistant device 110b can generate control information 1230 instructing video game console 1230 to perform some action within the playback of the video game.

Many of the examples herein discuss a home environment. In other examples, the devices and techniques discussed herein can also be set up in an office, public facility, etc.

Figure 5:
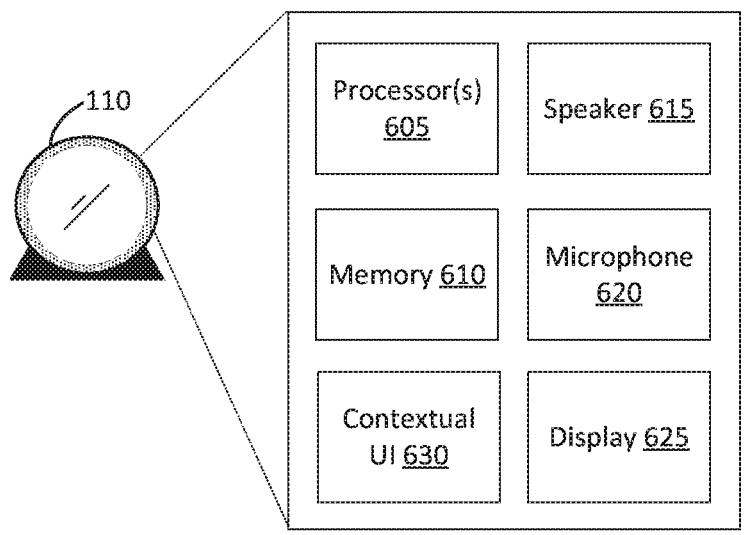
FIG. 5 illustrates an example of an assistant device.

FIG. 5 illustrates an example of an assistant device. In FIG. 5, home assistant device 110 can be an electronic device with one or more processors 605 (e.g., circuits) and memory 610 for storing instructions that can be executed by processors 605 to implement contextual user interface 630 providing the techniques described herein. Home assistant device 105 can also include microphone 620 (e.g., one or more microphones that can implement a microphone array) to convert sounds into electrical signals, and therefore, speech into data that can be processed using processors 605 and stored in memory 610. Speaker 615 can be used to provide audio output. Additionally, display 625 can display a GUI implemented by processors 605 and memory 610 to provide visual feedback. Memory 610 can be a non-transitory computer-readable storage media. Home assistant device 110 can also include various other hardware, such as cameras, antennas, etc. to implement the techniques disclosed herein. Thus, the examples described herein can be implemented with programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more application specific integrated circuits (ASICs), complex programmable logic devices (CPLDs), field programmable gate arrays (FPGAs), structured ASICs, etc.

Those skilled in the art will appreciate that the logic and process steps illustrated in the various flow diagrams discussed herein may be altered in a variety of ways. For example, the order of the logic may be rearranged, sub-steps may be performed in parallel, illustrated logic may be omitted, other logic may be included, etc. One will recognize that certain steps may be consolidated into a single step and that actions represented by a single step may be alternatively represented as a collection of substeps. The figures are designed to make the disclosed concepts more comprehensible to a human reader. Those skilled in the art will appreciate that actual data structures used to store this information may differ from the figures and/or tables shown, in that they, for example, may be organized in a different manner; may contain more or less information than shown; may be compressed, scrambled and/or encrypted; etc.

From the foregoing, it will be appreciated that specific embodiments of the invention have been described herein for purposes of illustration, but that various modifications can be made without deviating from the scope of the invention. Accordingly, the invention is not limited except as by the appended claims.

We claim:

1. A method for providing a graphical user interface (GUI) on a touchscreen of a home assistant device with artificial intelligence (AI) capabilities, the GUI providing content related to playback of a video game within an environment of the home assistant device, comprising:

receiving video game state information from a video game console, the video game state information indicating a state of playback of a video game within the environment;
determining that the video game state information indicates that the state of the playback of the video game includes a player character controlled by a user having a health status approaching a level that results in termination of a current iteration of the playback of the video game, and that the video game state information indicates that an item controlled by the player character has an inventory level approaching a level that results in the item not being functional until the inventory level is replenished;
determining characteristics of the user while playing the video game;
generating a first hot button for display on the GUI of the touchscreen of the home assistant device based on the determination that the state of the playback of the video game includes a player character controlled by a user having a health status approaching a level that results in termination of a current iteration of the playback of the video game, the first hot button configured to instruct the video game console to use an item or ability corresponding to the player character to modify the health status such that it adjusted to a modified level away from the level that results in termination of the current iteration of the playback of the video game;
providing an audio response indicating that the first hot button was generated based on the characteristics of the user while playing the video game;
generating a second hot button for display on the GUI of the touchscreen of the home assistant device based on the determination that the video game state information indicates that an item controlled by the player character has an inventory level approaching a level that results in the item not being functional until it is replenished, the second hot button configured to instruct the video game console to use an item or ability corresponding to the player character to modify the inventory level such that it is adjusted to a modified inventory level away from the level that results in the item not being functional;
determining that the first hot button or the second hot button was selected via a touch on the touchscreen of the home assistant device or via a response to the audio response; and
instructing the video game console to modify the health status or modify the inventory level based on the selection of the first hot button or the second hot button.

2. A method, comprising:
receiving video game state information representing a state of playback of a video game on a video game console;
determining, by a processor of an assistant device, that the state of the playback of the video game includes a player character controlled by a user, the player character having characteristics based on the playback of the video game;
determining, by the processor, characteristics of the user while playing the video game;
generating, by the processor, a first button on a graphical user interface (GUI) displayed upon a display of the assistant device, the first button providing an indication of a first action that can be performed by the video game to modify the characteristics of the player character;
providing an audio response indicating that the first button was generated, the audio response provided based on the characteristics of the user while playing the video game;
determining, by the processor, that the first button was selected in response to the audio response; and
instructing, by the processor, the video game console to modify the characteristics of the player character corresponding to the first action upon selection of the first button.

3. The method of claim 2, wherein the characteristics of the user include visual characteristics of the user while playing the video game.

4. The method of claim 3, wherein the visual characteristics include how the user is manipulating a controller used to play back the video game.

5. The method of claim 4, wherein the visual characteristics include how fast the user is manipulating the controller used to play back the video game.

6. The method of claim 2, wherein the characteristics of the user include audio characteristics of the user while playing the video game.

7. The method of claim 2, further comprising:
receiving graphical content related to similar subject matter of the video game being played back on the video game console; and
displaying the graphical content on the GUI with the first button.

8. The method of claim 2,
generating, by the processor, a second button on the GUI, the second button providing an indication of a second action that can be performed by the video game to modify the characteristics of the player character, the characteristics modified by the second action being different than the characteristics modified by the first action;
determining, by the processor, that the second button was selected; and
instructing, by the processor, the video game console to modify the characteristics of the player character upon selection of the second button.

9. The method of claim 8, further comprising:
determining that the video game state information indicates that a change in the playback of the video game is about to occur, wherein characteristics of the first button and the second button are based on the change in the playback of the video game that is about to occur.

10. The method of claim 2, further comprising:
determining that the video game state information indicates that a change in the playback of the video game is about to occur, wherein the first button is generated based on the change in the playback of the video game that is about to occur.

11. A computer program product, comprising one or more non-transitory computer-readable media having computer program instructions stored therein, the computer program instructions being configured such that, when executed by one or more computing devices, the computer program instructions cause the one or more computing devices to:
receive video game state information representing a state of playback of a video game on a video game console;
determine that the state of the playback of the video game includes a player character controlled by a user, the player character having characteristics based on the playback of the video game;
determine characteristics of the user while playing the video game;

generate a first button on a graphical user interface (GUI), the first button providing an indication of a first action that can be performed by the video game to modify the characteristics of the player character;
provide an audio response indicating that the first button was generated, the audio response provided based on the characteristics of the user while playing the video game;
determine that the first button was selected in response to the audio response; and
instruct the video game console to modify the characteristics of the player character corresponding to the first action upon selection of the first button.

12. The computer program product of claim 11, wherein the characteristics of the user include visual characteristics of the user while playing the video game.

13. The computer program product of claim 11, wherein the characteristics of the user include audio characteristics of the user while playing the video game.

14. The computer program product of claim 11, wherein the computer program instructions cause the one or more computing devices to:
receive graphical content related to similar subject matter of the video game being played back on the video game console; and
display the graphical content on the GUI with the first button.

15. The computer program product of claim 11, wherein the computer program instructions cause the one or more computing devices to:
generate a second button on the GUI, the second button providing an indication of a second action that can be performed by the video game to modify the characteristics of the player character, the characteristics modified by the second action being different than the characteristics modified by the first action;
determine that the second button was selected; and
instruct the video game console to modify the characteristics of the player character upon selection of the second button.

16. The computer program product of claim 15, wherein the computer program instructions cause the one or more computing devices to:
determine that the video game state information indicates that a change in the playback of the video game is about to occur, wherein characteristics of the first button and the second button are based on the change in the playback of the video game that is about to occur.

17. The computer program product of claim 11, wherein the computer program instructions cause the one or more computing devices to:
determine that the video game state information indicates that a change in the playback of the video game is about to occur, wherein the first button is generated based on the change in the playback of the video game that is about to occur.

18. An electronic device, comprising:
one or more processors; and
memory storing instructions, wherein the processor is configured to execute the instructions such that the processor and memory are configured to:
determine a state of a playback of a game played back on a game console, the game being played back by a user;
generate a first button on a graphical user interface (GUI), the first button providing an indication of a first action that can be performed by the game to adjust the playback of the game based on the state of the playback;
determine characteristics of the user while playing the game;
provide an audio response indicating that the first button was generated, the audio response provided based on the characteristics of the user while playing the game;
determine that the first button was selected in response to the audio response; and
instruct the game console to adjust the playback of the game corresponding to the first action upon selection of the first button.

19. The electronic device of claim 18, wherein the characteristics of the user include visual characteristics of the user while playing the game.

20. The electronic device of claim 18, wherein the characteristics of the user include audio characteristics of the user while playing the game.

21. The electronic device of claim 18, wherein the processor is configured to execute the instructions such that the processor and memory are configured to:
receive graphical content related to similar subject matter of the game being played back; and
display the graphical content on the GUI with the first button.

22. The electronic device of claim 18, wherein the processor is configured to execute the instructions such that the processor and memory are configured to:
generate a second button on the GUI, the second button providing an indication of a second action that can be performed by the game to modify the playback, the first action and the second action modifying the playback differently;
determine that the second button was selected; and
instruct the game console to modify the characteristics of the playback of the game upon selection of the second button.

23. The electronic device of claim 22, wherein the processor is configured to execute the instructions such that the processor and memory are configured to:
determine that the state of the playback of the game indicates that a change in the playback of the game is about to occur, wherein characteristics of the first button and the second button are based on the change in the playback of the game that is about to occur.

24. The electronic device of claim 18, wherein the processor is configured to execute the instructions such that the processor and memory are configured to:
determine that the state of the playback of the game indicates that a change in the playback of the game is about to occur, wherein the first button is generated based on the change in the playback of the game that is about to occur.

* * * * *